US009013671B2

(12) United States Patent
Huber et al.

(10) Patent No.: US 9,013,671 B2
(45) Date of Patent: Apr. 21, 2015

(54) SYSTEM AND METHOD FOR DISPLAYING CAPTIONS

(75) Inventors: Mark J. Huber, Burbank, CA (US); William Gibbens Redmann, Glendale, CA (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/977,850

(22) PCT Filed: Jan. 10, 2012

(86) PCT No.: PCT/US2012/020769
§ 371 (c)(1),
(2), (4) Date: Jul. 1, 2013

(87) PCT Pub. No.: WO2012/096952
PCT Pub. Date: Jul. 19, 2012

(65) Prior Publication Data
US 2013/0293777 A1     Nov. 7, 2013

Related U.S. Application Data

(60) Provisional application No. 61/431,314, filed on Jan. 10, 2011, provisional application No. 61/431,393, filed on Jan. 10, 2011.

(51) Int. Cl.
G03B 21/26     (2006.01)
H04N 7/088     (2006.01)
G03B 21/00     (2006.01)
G03B 21/28     (2006.01)

(52) U.S. Cl.
CPC .............. *H04N 7/0882* (2013.01); *G03B 21/00* (2013.01); *G03B 21/26* (2013.01); *G03B 21/28* (2013.01)

(58) Field of Classification Search
USPC ............ 353/7, 20, 11, 12, 13, 28, 94; 352/40, 352/55, 90; 348/468, 563, 725; 345/7, 9
See application file for complete search history.

(56) References Cited

U.S. PATENT DOCUMENTS

| | | | | |
|---|---|---|---|---|
| 4,879,603 A * | 11/1989 | Berman | ........................ | 348/832 |
| 5,488,496 A * | 1/1996 | Pine | ................................ | 349/96 |
| 5,570,944 A | 11/1996 | Seder et al. | | |
| 5,793,470 A | 8/1998 | Haseltine et al. | | |
| 6,741,323 B2 * | 5/2004 | Plunkett | ........................ | 352/90 |
| 6,988,803 B2 * | 1/2006 | Maximus | ........................ | 353/20 |
| 7,414,698 B2 | 8/2008 | Cashin et al. | | |
| 8,451,325 B2 * | 5/2013 | Birnbaum et al. | .............. | 348/53 |
| 2002/0101537 A1 | 8/2002 | Basson et al. | | |
| 2002/0122136 A1 | 9/2002 | Safadi et al. | | |
| 2002/0140863 A1 | 10/2002 | Park | | |
| 2003/0128296 A1 | 7/2003 | Lee | | |
| 2004/0032379 A1 | 2/2004 | Price et al. | | |

(Continued)

OTHER PUBLICATIONS

Robitaille: "Movie Magic for the Hearing Impaired" Nov. 1, 2001.
(Continued)

*Primary Examiner* — William C Dowling
(74) *Attorney, Agent, or Firm* — Robert D. Shedd; Robert B. Levy

(57) ABSTRACT

A system and method are disclosed for displaying different captions for selective viewing. A display is used for showing the captions in different color and/or polarization combinations, and color-selective filters and/or polarizers are used for separately viewing the individual captions.

18 Claims, 17 Drawing Sheets

(56) References Cited

U.S. PATENT DOCUMENTS

| | | |
|---|---|---|
| 2004/0246390 A1 | 12/2004 | Yanagisawa |
| 2005/0108026 A1 | 5/2005 | Brierre et al. |
| 2007/0126986 A1 | 6/2007 | Yamazaki et al. |
| 2007/0132953 A1* | 6/2007 | Silverstein ................... 353/7 |
| 2007/0216868 A1 | 9/2007 | Cashin et al. |
| 2007/0252913 A1 | 11/2007 | Minobe |
| 2008/0292272 A1 | 11/2008 | Yamazaki et al. |
| 2008/0309884 A1 | 12/2008 | O'Dor et al. |
| 2010/0201954 A1 | 8/2010 | West |
| 2011/0050727 A1 | 3/2011 | Mukawa |

OTHER PUBLICATIONS

"Rear Window Captioning System", Wikipedia, http://en.wikipedia.org/wiki/Rear_Window_Captioning_System, Feb. 14, 2010.

\* cited by examiner

SYSTEM AND METHOD FOR DISPLAYING CAPTIONS

CROSS-REFERENCE TO RELATED APPLICATIONS

This application claims the benefit, under 35 U.S.C. §365 of International Application PCT/US2012/020769 filed Jan. 10, 2012 which was published in accordance with PCT Article 21(2) on Jul. 19, 2012 in English, and which claims the benefit of U.S. provisional patent application Nos. 61/431,314 filed Jan. 10, 2011 and 61/431,393 filed Jan. 10, 2011.

BACKGROUND

Some hearing impaired individuals rely on captioning systems to enjoy a movie or other theatrical presentation. Some individuals fluent in a language other than the one used in the main audio of a presentation, require subtitles to understand and enjoy the presentation. In the United States, Congress is expected to rule that exhibition theaters are required to provide systems for hearing-impaired guests. There may be a further opportunity to expand the theatrical audience by providing multiple languages in the same mode, if it can be achieved at low incremental cost.

Existing techniques provide personalized multi-language display devices, which may obtain the current stream of captions or subtitles by radio frequency (RF) or infrared (IR) flood in the theater. In the latter case, an infrared flood signal modulated by multi-channel audio program is provided to the auditorium, and an audience's headset detects the IR and demodulates the audio program. There can be multiple channels to which the demodulator can be tuned. Such devices may be expensive, prone to theft or breakage, require battery recharging, and otherwise suffer from limited operational life. Additionally, there is substantial opportunity for leakage between auditoriums in a multiplex, with IR flood signal leaking from one auditorium to another through the projection booth, or RF leaks from one room to the next through the walls. Thus, it is important for each device to have the correct auditorium channel selected, as well as the correct language.

The REAR WINDOW™ system, developed and promoted by WGBH, the Boston PBS network affiliate, provides a LED display at the rear of the auditorium, facing forward. A single stream of captions or subtitles is displayed as mirrored text on the LED panel, to be viewed by theater patrons having an adjustable, reflective plate. The reflective plate and the display are both durable and inexpensive.

Each of these approaches has become more feasible with the introduction of digital cinema servers and development of the related formats and protocols by SMPTE (specifically, ST 429-12:2008 D-Cinema Packaging—Caption and Closed Subtitle; ST 430-10:2010 D-Cinema Operations—Auxiliary Content Synchronization Protocol; and, ST 430-11:2010 D-Cinema Operations—Auxiliary Resource Presentation List; all of which are herein incorporated by reference in their entireties).

In an exhibition theater, open (on-screen) subtitles work well for translating the primary audio language of a presentation as text into a language to be read by the majority of the audience. Closed subtitles are preferred when one or more translations are needed. Also, closed captions are provided for hearing-impaired audience members, where the captions are in the same language as the primary audio language. Though "caption" is generally used to mean text in the same language as that of the primary audio presentation and "subtitle" is used to mean text translating the dialog into a language other than the primary language of the audio presentation, the terms "caption" and "subtitle" are used interchangeably in this discussion.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures. The drawings are not to scale, and one or more features may be expanded or reduced for clarity.

SUMMARY OF THE INVENTION

Figure 1:
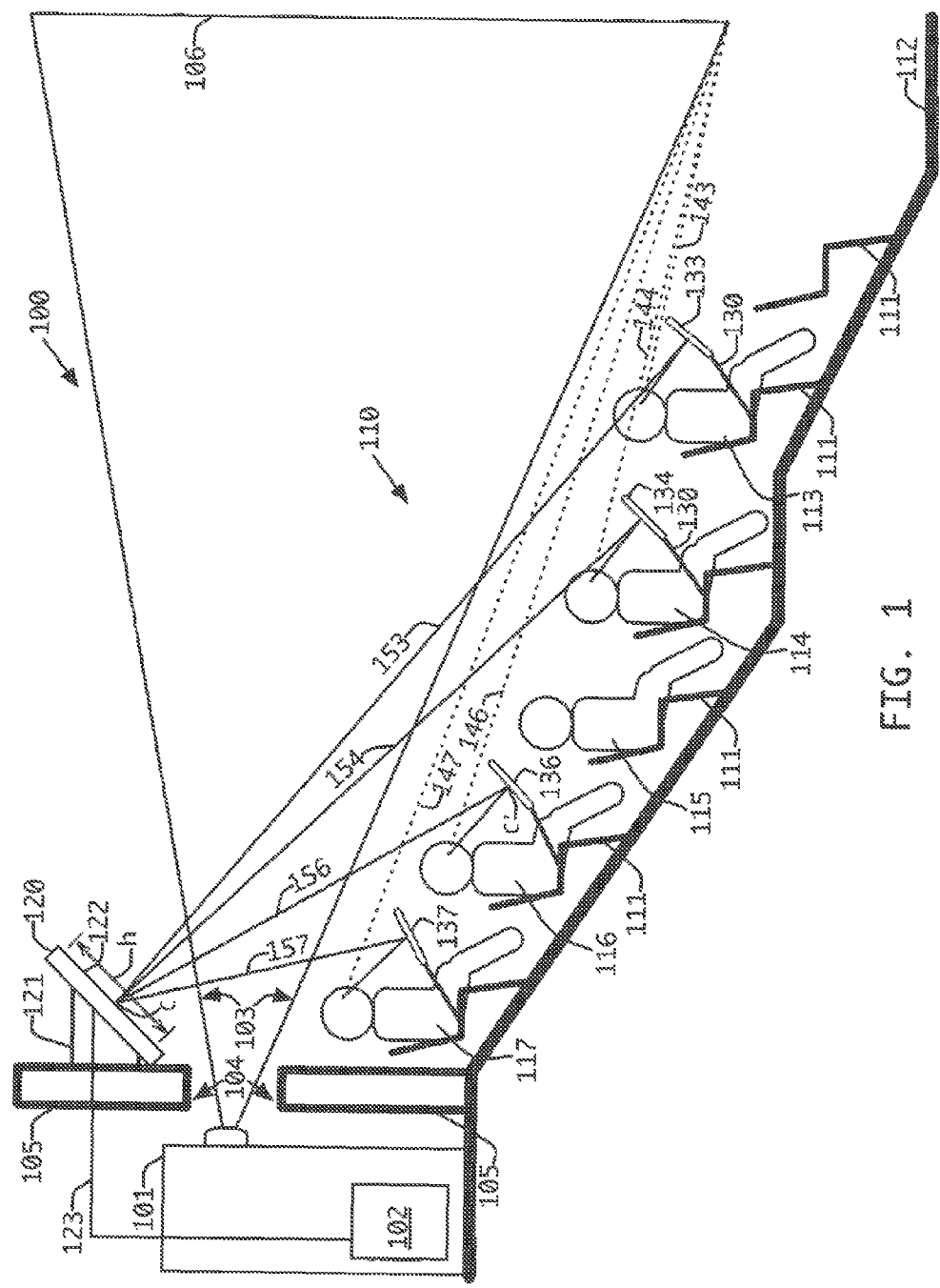
FIG. 1 is a side view of an exhibition auditorium in which closed captions are displayed using chromatic and/or polarization encoding.

Embodiments of the present principles provide a system and method for displaying different captions for selective viewing.

One embodiment provides a system for displaying captions for viewing, which includes a display for showing at least two captions in at least one of different colors with different spectral ranges and substantially complementary polarizations.

Another embodiment provides a reflector for selective viewing of captions, a plurality of which are shown on a display in at least one of different colors and polarizations. The reflector includes a filter configured for viewing a caption on the display in reflection mode, with the filter being at least one of a color filter and a polarizer for selecting the caption for viewing without interference from other captions.

Another embodiment provides a method for displaying captions for viewing, and includes showing at least a first caption and a second caption on a display; in which the first caption is shown in at least one of a first color and a first polarization, and the second caption is shown in at least one of a second color having a spectral range different from the first color and a second polarization that is complementary to the first polarization.

DETAILED DESCRIPTION

Embodiments of the present invention provide a system that includes a display (e.g., a large format HDTV monitor) that display different sets of captions or subtitles, each of which can be separately revealed when the display is viewed through each of a set of filters. Depending on the configuration, the filters can be reflective color filters and/or polarizers and the captions can be displayed simultaneously or in a time-multiplexed manner. Although sets of captions or subtitles in different languages are used as examples in the following discussions, the present principles can generally be used for selective viewing of different information, commentaries, text or graphics that are displayed on a monitor or screen. Specifically, such information can relate to or be supplementary to a main feature, for example, commentaries from directors or critics about a presentation, captions or subtitles directed to different viewers watching a main program (e.g., captions in different languages, or different versions of the caption in the same language, and so on).

In one embodiment, different versions of a caption or captions in different languages are shown on the display with different colors so that each caption can be selectively viewed through a corresponding color filter. The filters are provided on a multi-sided or multi-faceted reflector, allowing a viewer to select a caption or language by employing different facets of the reflector, with each facet reflecting a different color band (or bands, each corresponding to different wavelength ranges).

In another embodiment, two different captions are displayed over the entire display using orthogonal polarizations, so that the different caption can be selectively viewed through appropriate polarizers. In yet another embodiment, the display is configured with a first half of pixels having a first polarization and the second half having a second polarization that is orthogonal to the first polarization. Captions in a first language are displayed on the first half of the pixels, while those in a second language are displayed on the second half. When viewed through correspondingly polarized reflectors, the captions in one of the languages is revealed.

Furthermore, captions in multiple languages can be presented in different subsets of pixels, each with different color and polarization combinations. For example, a first half of pixels can be used for displaying two different captions in a first polarization: a first caption in red and a second caption in blue. A second half of pixels can be used for displaying two other captions in a second polarization: a third caption in red and a fourth caption in blue. Such color-polarization combinations can readily double the number of available languages displayed in color alone (because of two polarizations), or allows separate languages or captions to be displayed in an arbitrary color, rather than restricting languages to be displayed in the monitor's primary colors or the complement. Even more languages are possible on the same display, using appropriate red, green, and blue filters; or more, if the display supports larger numbers of color bands.

Referring to FIG. 1, exhibition theater 100 includes a projection system 101, for example, a digital cinema projection system including a digital cinema server 102. Exhibition theater 100 includes auditorium 110 with an audience seating area including seats 111 attached to floor 112, which in this example is steeply raked "stadium" style seating.

Projection system 101 has projection field 103 which is shown through portal 104 in rear wall 105 to provide an image on screen 106. Normally, single or double port glass (not shown) would seal portal 104 to provide acoustic isolation between the booth housing projection system 101 and auditorium 110. Not shown is the audio portion of projection system 101, including speakers placed behind screen 106 and elsewhere within auditorium 110.

Patrons 113-117, among others, sit facing screen 106 to watch a presentation or program. Behind them, above portal 104, closed caption display system 120 is mounted to rear wall 105 with brackets 121. In some installations, closed caption display system 120 may be ceiling mounted, or mounted below or to the side of portal 104. The display portion of closed caption display system 120 has a front surface 122, set to be visible to patrons under the conditions described below. Closed caption display system 120 has communication with projection system 101 (typically, as shown, more specifically to digital cinema server 102) through communication link 123 whereby caption text and timing information are provided for display. Note that "open" captions or subtitles would appear on or near screen 106 and be visible to all audience member, while "closed" captions are visible only to those audience members with the appropriate devices for viewing the closed captions.

Some of the patrons or audience, e.g., 113, 114, 116, and 117, sit in seats equipped with reflector arms 130 having reflective panels 133, 134, 136 and 137, respectively, which when properly adjusted, permit the corresponding patrons to view closed caption display system 120. Reflective panels 133, 134, 136, and 137 may be positioned below the respective direct sight lines 143, 144, 146 and 147 between corresponding patrons 113, 114, 116 and 117 and the bottom of screen 106 so that the reflective panels will not obscure any portion of screen 106.

When properly aligned, each reflective panel (e.g., 133, 134, 136 and 137) provides the corresponding patron with a reflected sightline (e.g., 153, 154, 156, 157) so that the patron can view a minor image of the display of closed caption display system 120. For simplicity in this illustration, a single reflected sightline (e.g., from the center of the caption display to the center of a reflective panel and then to a patron) is also used to generally represent the field of view by a patron of the pixels on the closed caption display (i.e., front surface 122 of the closed caption display system 120), as seen from a reflective panel. The value "h" is the maximum height of an entire caption as displayed on the front surface 122 of the closed caption display.

Figure 2A:
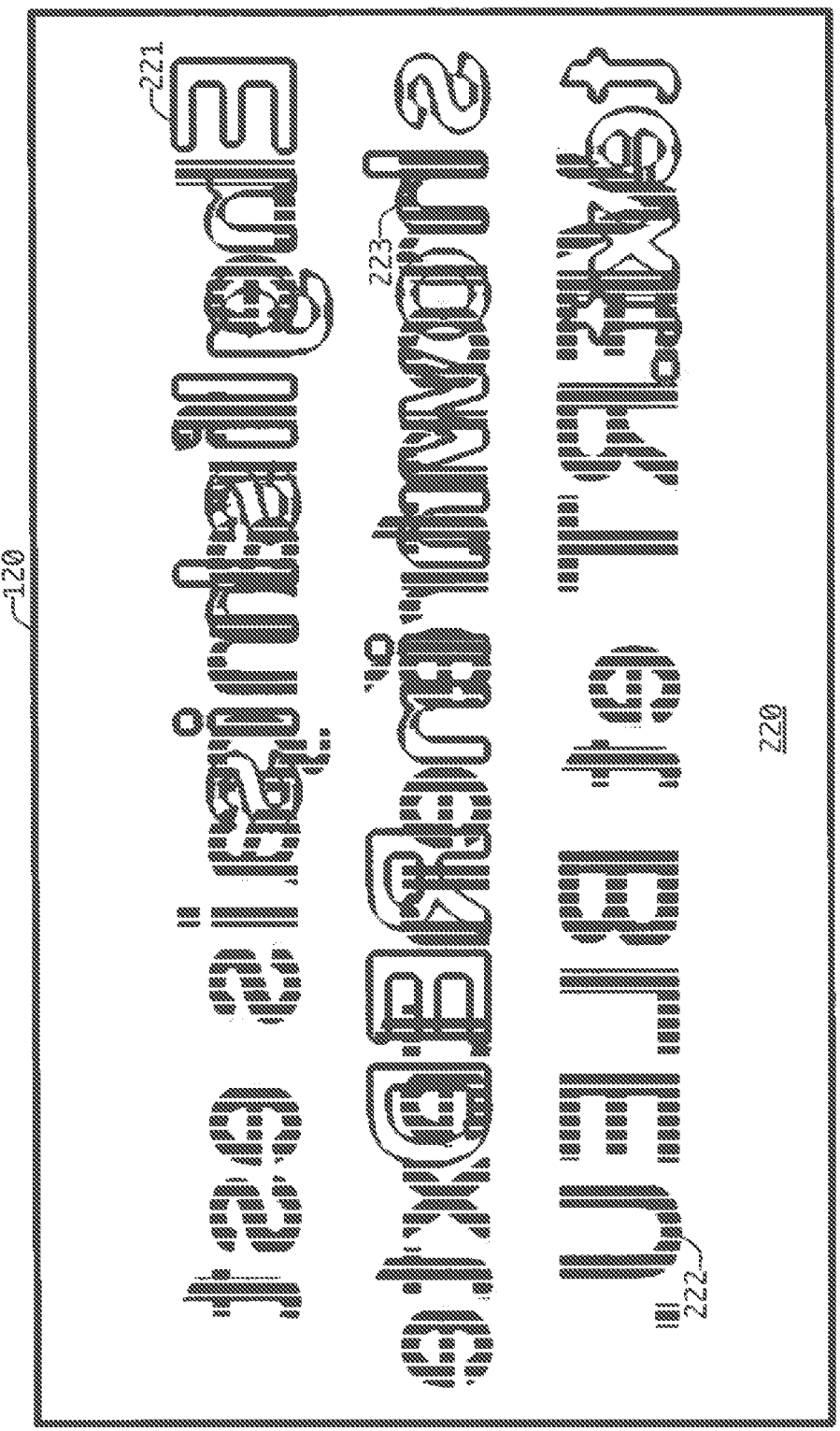
FIG. 2A is a closed caption display with two captions overlaid in the same image, as might be seen when viewed directly.
Figure 3A:
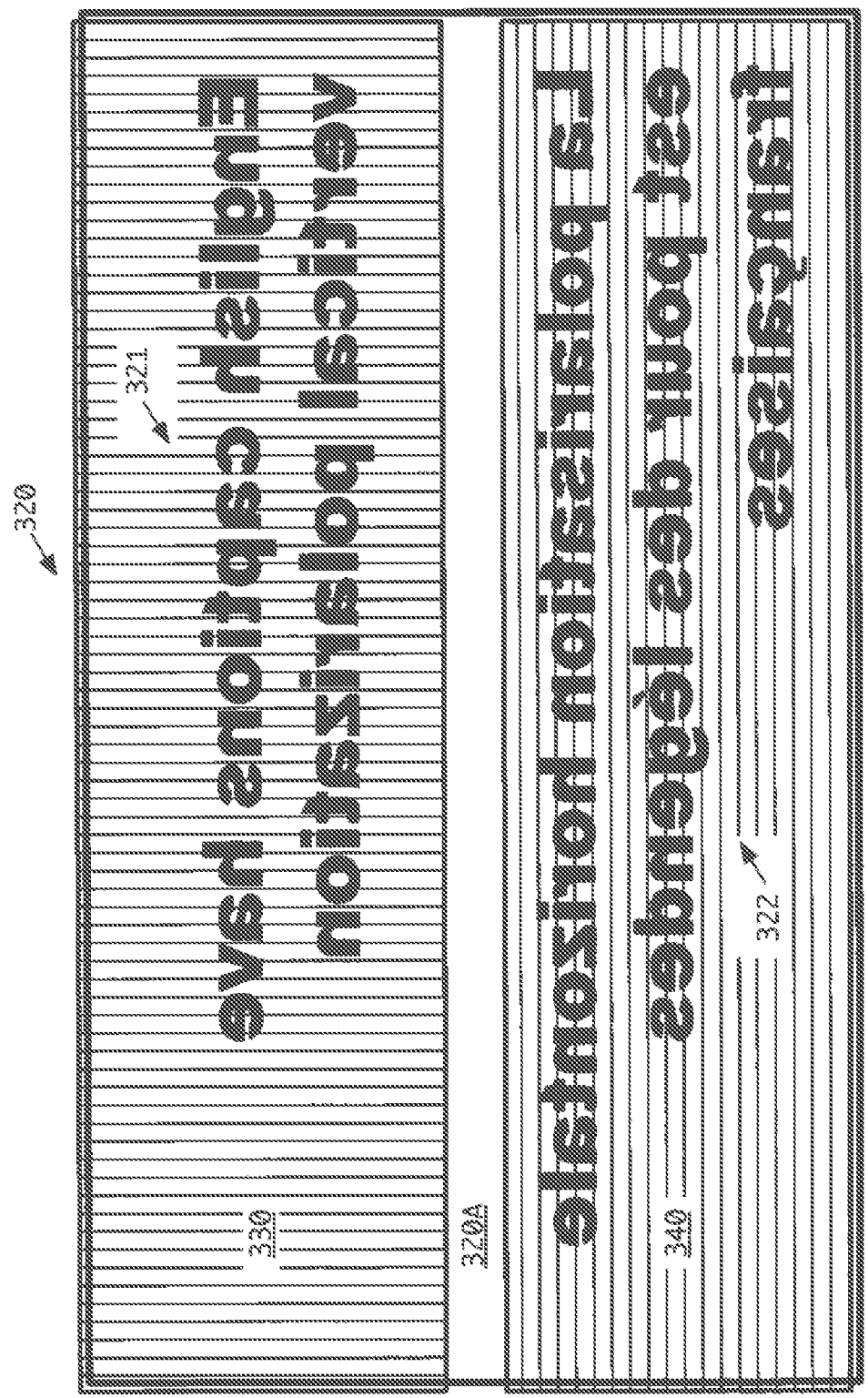
FIG. 3A shows one embodiment of the closed caption display in which the two polarizations occupy different regions of the screen, upon which two captions are displayed.

FIGS. 2A and 3A show two embodiments from a closed caption display system 120 as viewed from inside the auditorium towards the system's front surface 122 (e.g., when an audience member turns around and looks towards the back wall 105). FIG. 2A illustrates a multi-color display 220 (e.g., a view of the front surface 122 of the display system 120), in which two or more subtitles are shown in different colors, and FIG. 3A illustrates a dual-polarization display 320 in which two subtitles are shown in different polarizations.

In the embodiment of FIG. 2A, multi-color display 220 can be an HDTV monitor, and shows two captions simultaneously, for example, a first caption 221 (with letters designated by clear outlines in FIG. 2A) using the red display channel, and a second caption 222 (with letters designated by thick vertical lines) using the green and blue channels, which makes caption 222 appear visually to be cyan. In areas where portions of captions 221 and 222 overlap, e.g., in overlap region 223, the colors of the separate captions 221 and 222 combine, in the case of region 223, to form white. Note that in this and subsequent figures related to the multi-color display, for the purpose of making a clear and reproducible illustration, the images on display 220 are shown as a negative, i.e., background regions that are illustrated as unmarked white (i.e., regions outside of the subtitle or caption text) would actually be black, and the caption or text regions would actually be emissive (e.g., red, cyan, or white). Note that the first and second captions 221 and 222 are reversed left-to-right, since in use, they will be viewed by audience in reflection mode.

Figure 2B:
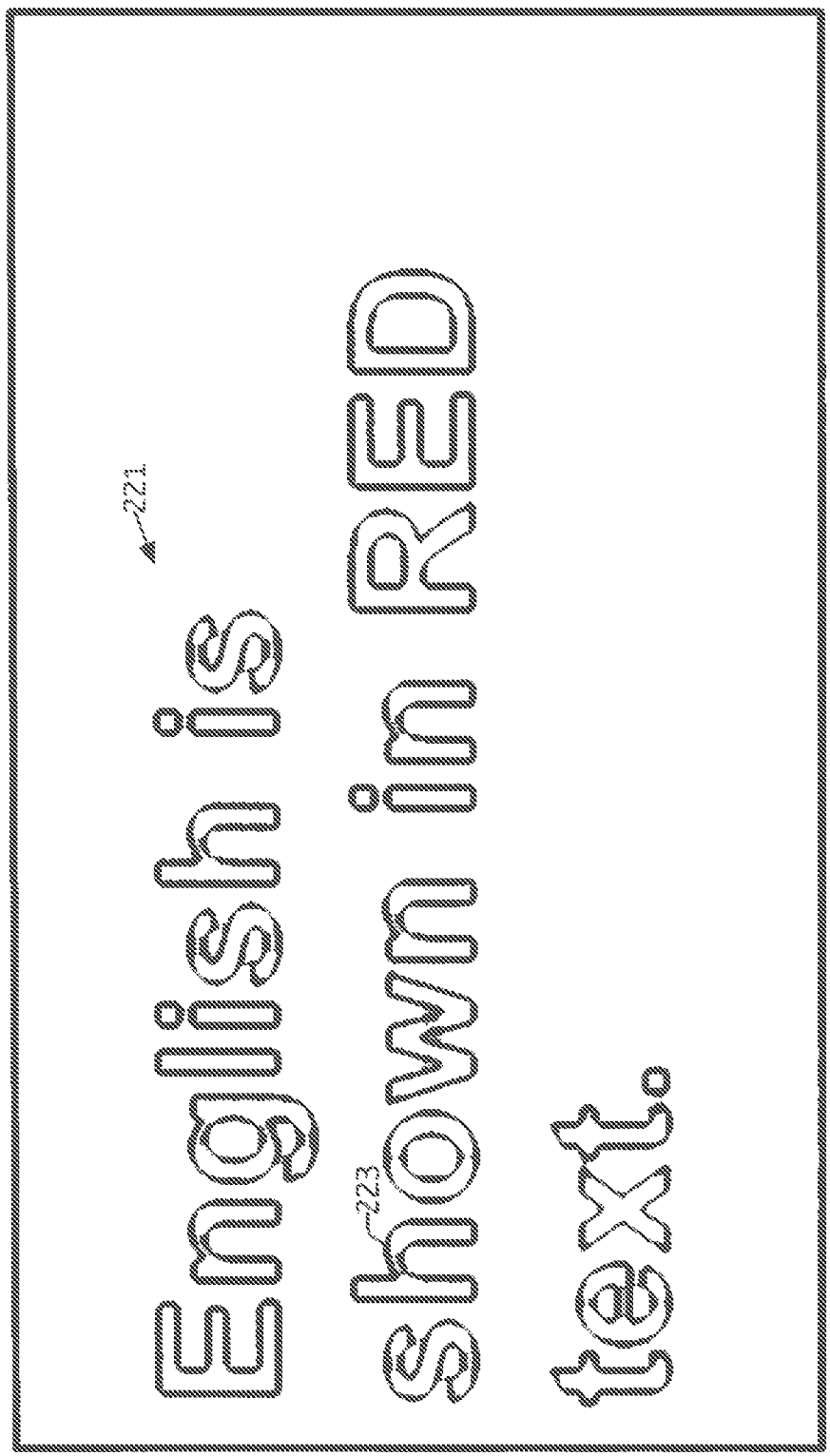
FIG. 2B is the closed caption display of FIG. 2A viewed through a first reflector to reveal the first caption.

In one embodiment, reflective panels 133 and 134 are both color selective, and are designed for use with multi-color display 220. For example, reflective panel 133 is configured to reflect at least a portion of the spectrum at longer wavelengths (e.g., red), but reflects little or none of the shorter wavelengths in the visible spectrum (e.g., green, blue) along sightline 153. As a result, when looking at reflective panel 133, patron 113 will see a reflection of closed caption display 220, as shown in FIG. 2B. In this reflected image, caption 221 reads correctly from left to right (i.e., the text is no longer reversed as in FIG. 2A). Since panel 133 does not reflect green and blue colors, the second caption 222 (in blue and green colors) is substantially absent, and regions 223 of the first caption 221 (that overlap with portions of the second caption 222 in FIG. 2A) are now unobstructed by the second caption 222. If the same panel 133 were to be used at a different seat and/or by another patron, the relative position/orientation of the panel can be adjusted for proper viewing of the caption along the sightline associated with the different seat or patron.

Figure 2C:
FIG. 2C is the closed caption display of FIG. 2A viewed through a second reflector, to reveal the second caption.

FIG. 2C shows the closed caption display of FIG. 2A as viewed through the second reflective panel 134 to reveal the second caption 222. Second reflective panel 134 reflects at least a portion of the spectrum at shorter wavelengths (e.g., green, blue), but reflects little or none of the longer wavelengths (e.g., red) along sightline 154. As a result, when looking at reflective panel 134, patron 114 will see a reflection of closed caption 222, which reads correctly from left to right (i.e., the text is no longer reversed as in FIG. 2A). The first caption 221 is substantially absent because its red color is not reflected by panel 134.

Thus, although closed caption display 220 is showing multiple, overlapping closed captions 221 and 222 simultaneously, patrons 113 and 114 using reflector panels 133 and 134 each sees only one of the multiple closed captions, i.e., either the English or the French caption.

FIG. 3A shows another embodiment of the closed caption display system in which two different polarizations in different regions of a dual-polarization display 320 are used to display two different captions, for example, in different languages.

The upper portion (can be a half) of display 320 is covered by first polarizer 330 and the lower portion (can be a half) of display 320 is covered by a second polarizer 340. Although FIG. 3A shows a blank middle portion 320A of display that is not covered by either polarizer 330 or 340, it is understood that other configurations can also be used, e.g., with the two polarizers abutting each other (in one embodiment, near or at a center line of the display), or a frame or holder provided at the middle portion for holding the polarizers.

Polarizers 330 and 340 may be linear polarizers, each orthogonal to the other. For example, if polarizer 330 is vertically polarized, polarizer 340 will have the complementary or orthogonal polarization, i.e., horizontal polarization. In an alternative embodiment, polarizers 330 and 340 can be left- and right-handed circular polarizers.

In this embodiment, display 320 comprises an HDTV monitor, and as shown in FIG. 3A, shows two captions simultaneously, a first caption 321 is displayed in the region under polarizer 330, and a second caption 322 is displayed in the region under polarizer 340. Captions 321 and 322 do not overlap. In this embodiment, each caption can be displayed in any color, without restriction. This has the advantage of allowing the caption to be displayed in a color selected to be artistically compatible with the presentation on screen 106. Note that in this and subsequent figures, for the purpose of making a clear and reproducible illustration, the images on display 320 and others are shown as a negative, i.e., background regions (outside of the captions or text) that are illustrated as unmarked white would actually be black, and regions that are black lines would actually be emissive (white, or some particular color). Note that the first and second captions 321 and 322 are reversed left-to-right, since in use, they will be viewed in reflection.

Figure 3B:
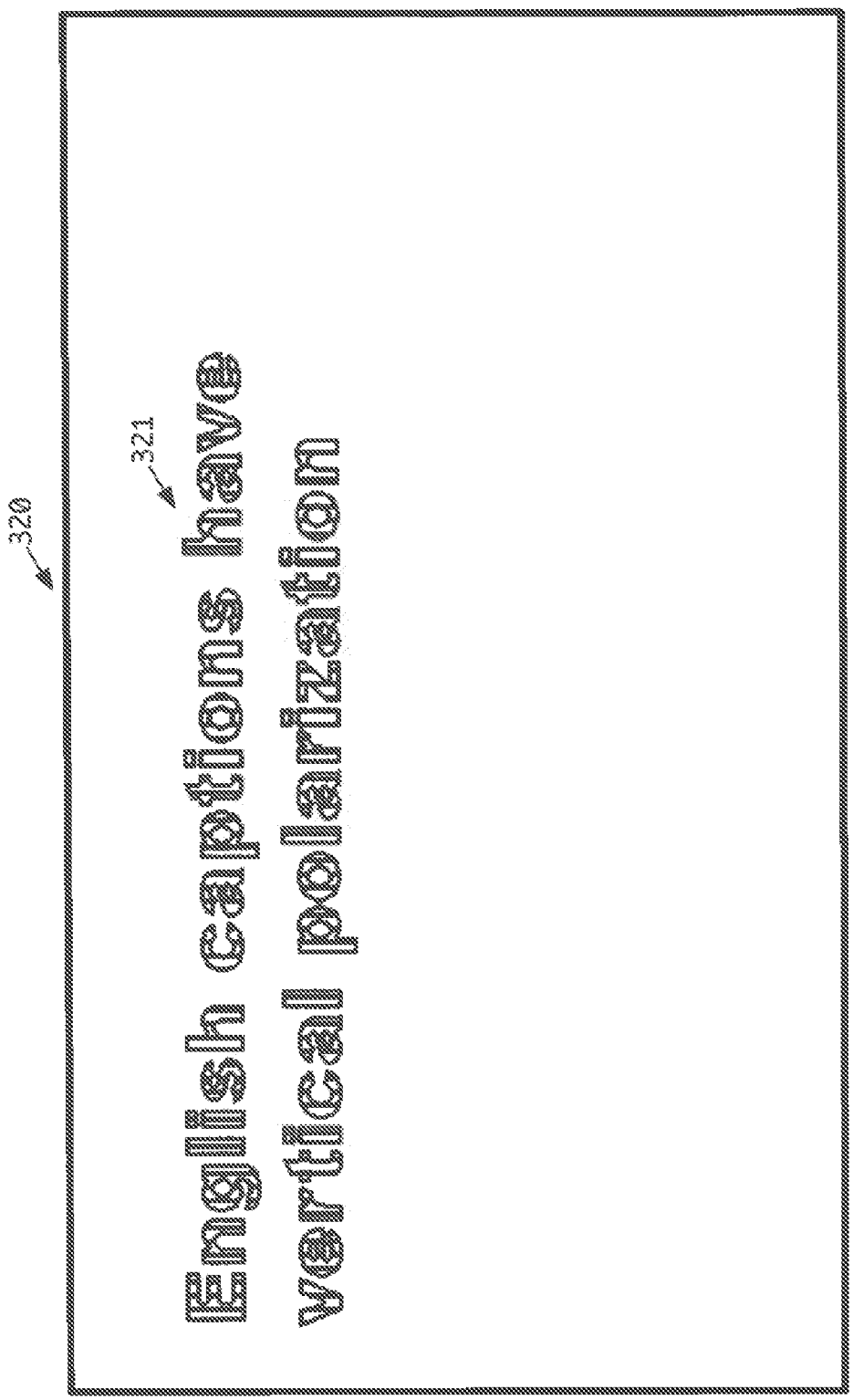
FIG. 3B shows the embodiment of FIG. 3A viewed through a first polarizing reflector to reveal the first caption.

FIG. 3B shows the embodiment of FIG. 3A viewed through a first polarizing reflector to reveal the first caption. For example, reflective panel 136 may reflect the first polarization (e.g., vertical), but reflect little or none of the second polarization (e.g., horizontal) along sightline 156. As a result, when looking at dual-polarization caption display 320 through reflective panel 136, patron 116 will see a reflection of closed caption 321, which reads correctly from left to right (i.e., the text is no longer reversed as in FIG. 3A), and the second caption 322 is substantially absent.

Figure 3C:
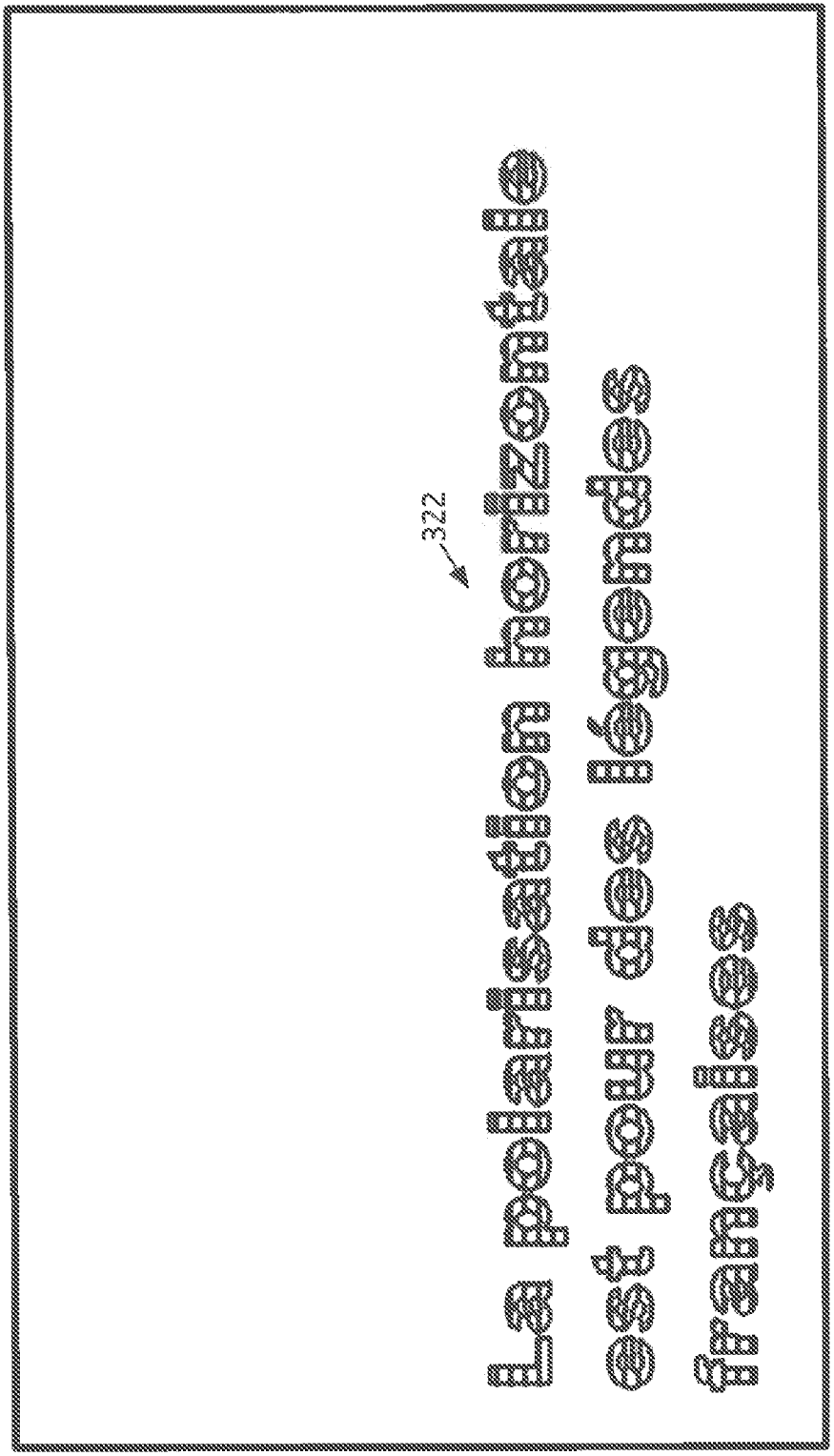
FIG. 3C shows the embodiment of FIG. 3A viewed through a second polarizing reflector to reveal the second caption.

Likewise, reflective panel 137 may reflect the second polarization (e.g., horizontal), but reflect little or none of the first polarization (e.g., vertical) along sightline 157. As a result, when looking at reflective panel 137, patron 117 will see a reflection of closed caption 322, as shown in FIG. 3C, which reads correctly from left to right (i.e., the text is no longer reversed as in FIG. 3A), and the first caption 321 is substantially absent.

Thus, although display 320 is showing multiple closed captions 321 and 322 simultaneously, patrons 116 and 117 using reflector panels 136 and 137 to view the closed captions each sees only one of the multiple closed captions, i.e., either in English or in French.

Figure 4A:
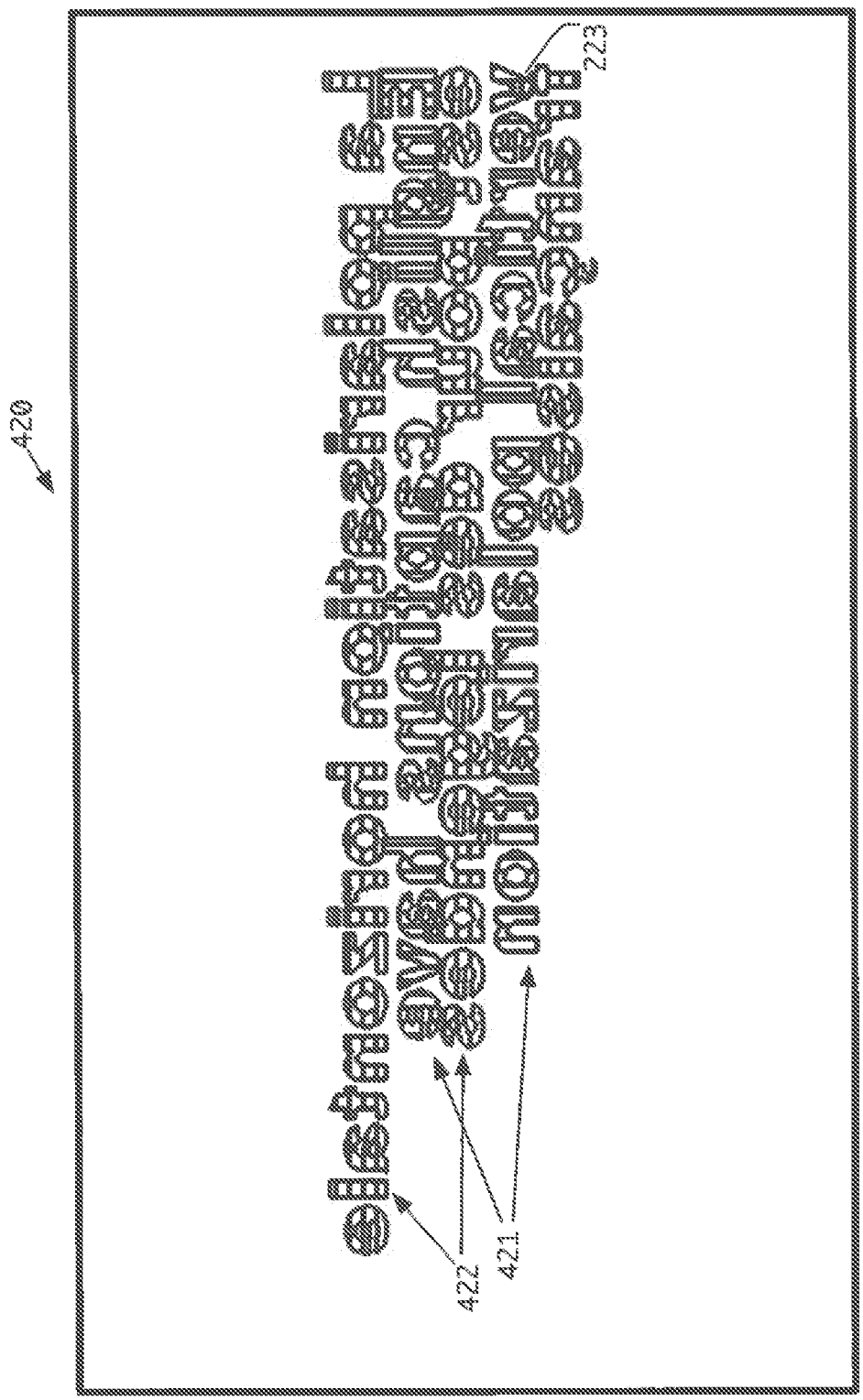
FIG. 4A shows another embodiment of the closed caption display in which the two polarizations are used throughout the screen, upon which two captions are displayed.

FIG. 4A shows another embodiment of the closed caption display system 120 in which two orthogonal polarizations are used over the entire area of the screen for displaying two different captions, specifically, the caption display 420 of system 120 as viewed from inside the auditorium towards the system's front surface 122 (e.g., when an audience member turns around and looks toward the back wall 105). The entirety of display 420 can selectively display distinct images in each of a first and second polarizations that are orthogonal to each other (e.g., vertical and horizontal, or right-handed circular and left-handed circular). In some implementations, display 420 is composed of a spatially multiplexed array of display pixels having alternating polarization (e.g., alternating columns or alternating rows of pixels have opposite polarizations). An example of an HDTV monitor having suitable alternatingly polarized pixels is model XVT3D650SV by VIZIO, Inc. of Irvine, Calif., and the Infinia 55LW5600 by LG Electronics of Seoul, Korea, both of which use circular polarization.

In an alternative embodiment, all the pixels of the display may be time-domain multiplexed to display a first image in the first polarization and then a second image in the second polarization, for example by covering the entire screen with an electrically controlled circular polarizer comprising a linear polarizer and liquid crystal cell, such as the Monitor ZScreen 2000 Dual manufactured and marketed by Real-D, Inc. of Beverly Hills, Calif. Individual captions in one of two polarizations can still be selectively viewed by using a reflector with appropriate polarization. If the main presentation is in three-dimension (3D), time-multiplexed polarized captions can be used without affecting 3D program viewing if passive 3D glasses are used. However, if shutter glasses are used for the 3D program, then time-multiplexing of the different captions should be properly synchronized with the 3D shutter glasses. Note that time-multiplexing of the captions can also be used in conjunction with captions shown in different colors.

In this embodiment of FIG. 4A, display 420 comprises an HDTV monitor such as those mentioned, and is showing two captions simultaneously, a first caption 421 is displayed in the first polarization, and a second caption 422 is displayed in the second polarization. Captions 421 and 422 overlap, as for example in region 223. In this embodiment, each caption can be displayed in any color, without restriction.

Figure 4B:
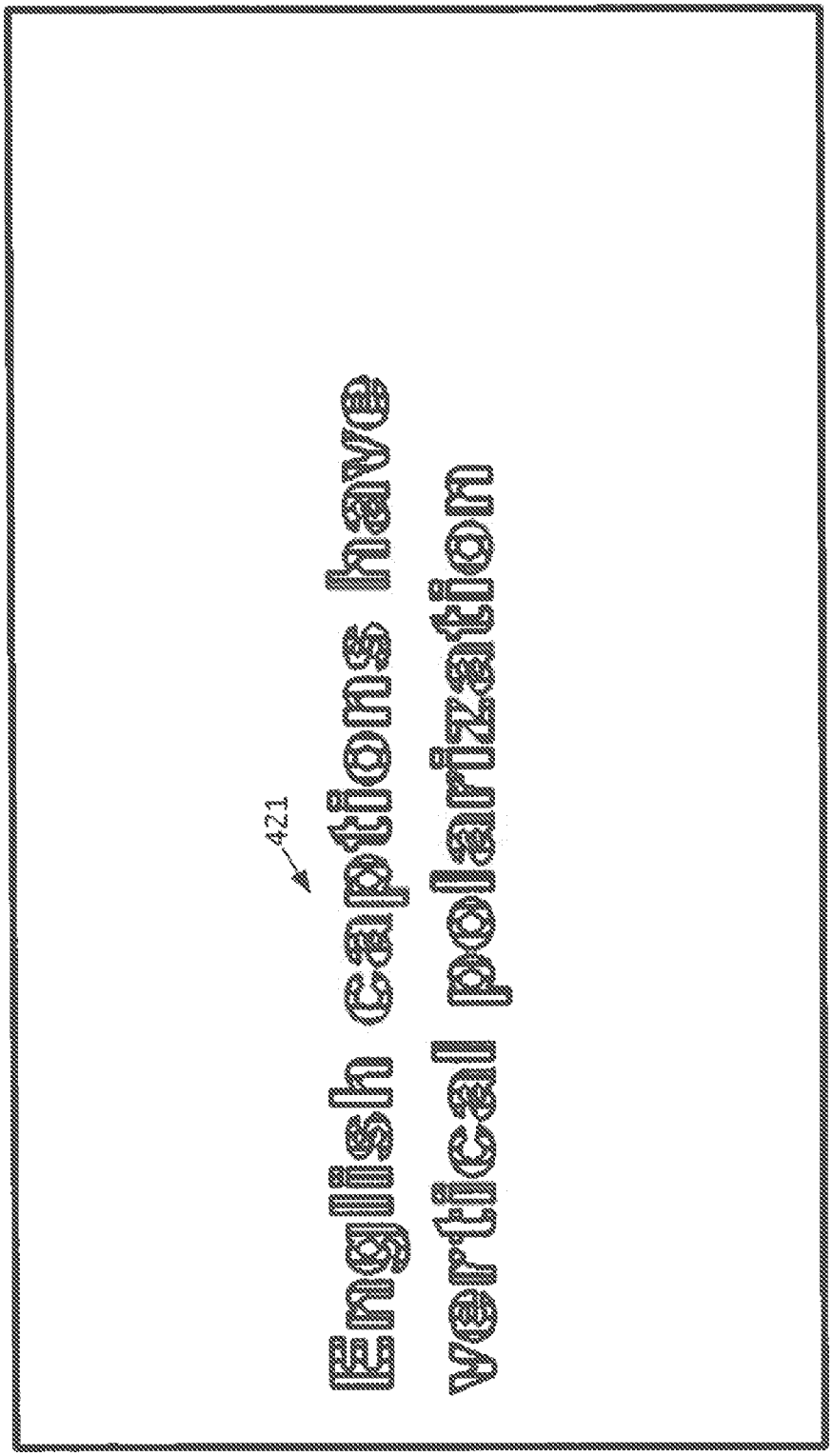
FIG. 4B shows the embodiment of FIG. 4A viewed through the first polarizing reflector, to reveal the first caption.

FIG. 4B shows the caption display of FIG. 4A as viewed through the first polarizing reflector to reveal the first caption. For example, reflective panel 136 reflects a first polarization (e.g., right-handed circular), but reflects little or none of the second polarization (e.g., left-handed circular) along sightline 156. As a result, when looking at caption display 420 through reflective panel 136, patron 116 will see a reflection of closed caption 421, which reads correctly from left to right (i.e., the text is no longer reversed as in FIG. 4A), and the second caption 422 is substantially absent. Details for one embodiment of the reflective panel 136 configured for circular polarization are presented in a later section.

Figure 4C:
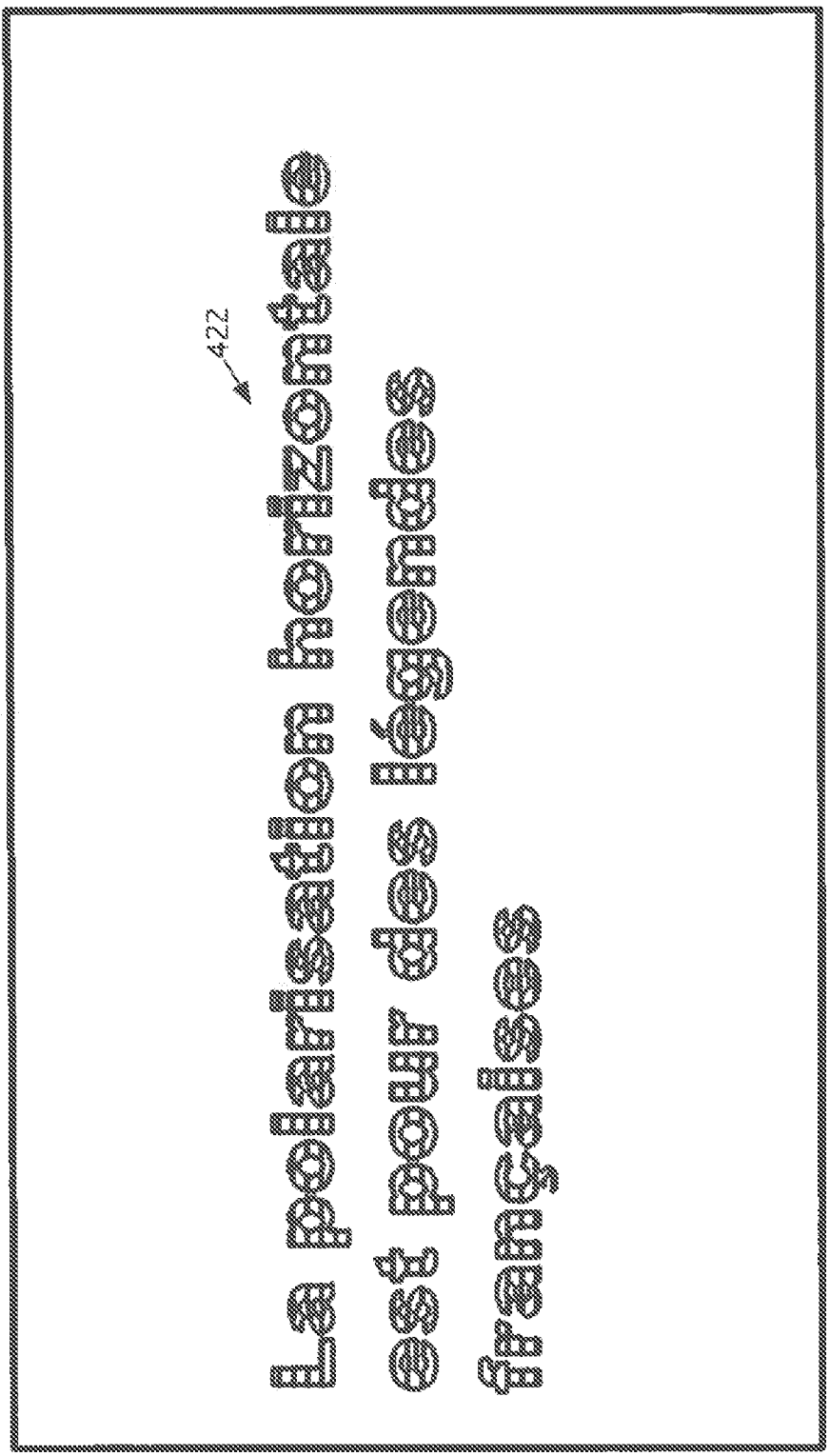
FIG. 4C shows the embodiment of FIG. 4A viewed through the second polarizing reflector, to reveal the second caption.

FIG. 4C shows the caption display of FIG. 4A viewed through another polarizing reflector to reveal the second caption. For example, reflective panel 137 may reflect the second polarization (e.g., left-handed circular), but reflect little or none of the first polarization (e.g., right-handed circular) along sightline 157. As a result, patron 117 will see a reflection of closed caption 422, which reads correctly from left to right (i.e., the text is no longer reversed as in FIG. 4A), and the first caption 421 is substantially absent. Details for one embodiment of the reflective panel 137 configured for circular polarization are presented in a later section.

Thus, although display 420 is showing multiple, overlapping closed captions 421 and 422 simultaneously, patrons 116 and 117 using reflector panels 136 and 137 to view the closed captions each sees only one of the multiple closed captions, i.e., either in English or in French.

Figure 5:
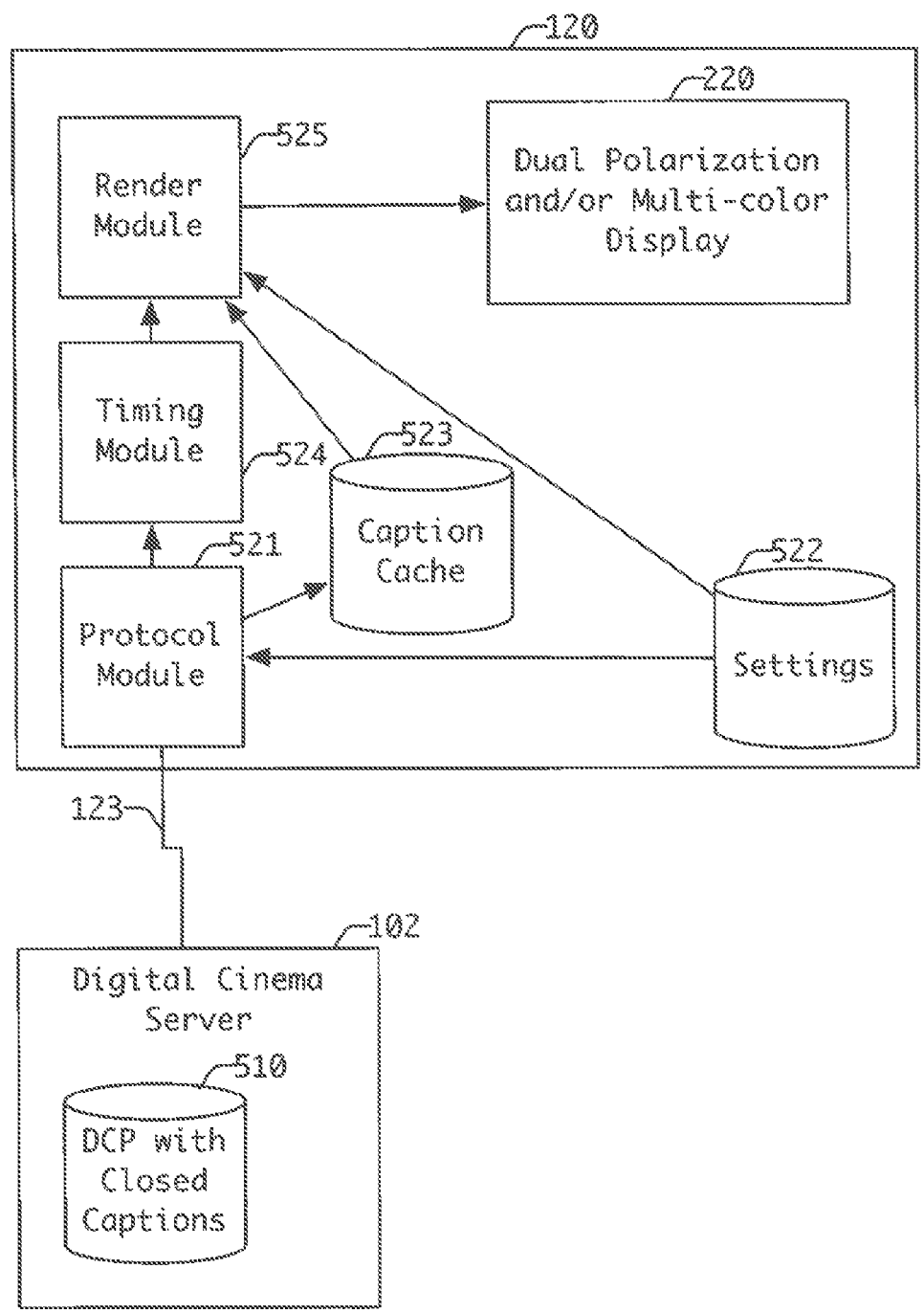
FIG. 5 is a system block diagram showing the main elements of the closed caption display and the connection to a digital cinema server.

FIG. 5 is a system block diagram showing the main elements of the closed caption display and connections to a digital cinema server. To better understand how the closed caption display of the present invention can be applied in digital cinema presentations, the following background may be useful. In 2010, the Society of Motion Picture and Television Engineers (SMPTE) of White Plains, N.Y., published two standards (ST 430-10:2010 D-Cinema Operations—Auxiliary Content Synchronization Protocol; and, ST 430-11:2010 D-Cinema Operations—Auxiliary Resource Presentation List) to allow one or more "Auxiliary Content Servers" (ACS), such as closed caption devices, to obtain an "Auxiliary Resource Presentation List" (RPL) from the digital cinema server. The RPL enumerates each of the various auxiliary resources (e.g., the closed captions and/or closed subtitles) available for a presentation, and includes an identification of the language for each, and identifies the location where the resource file is available. In the prior art, an ACS would select one of the resource files by type (e.g., "caption") and language, to be retrieved and parsed. As playout of the presentation begins, the digital cinema server uses this protocol to signal the ACS as to the current position with the presentation so that the ACS may display the captions in synchrony with a digital cinema presentation.

Auxiliary resource files representing closed captions or closed subtitles may be in the format specified by a 2008 SMPTE standard (ST 0429-12-2008 D-Cinema Packaging—Caption and Closed Subtitle), in which each caption is provided along with a specification for the interval during which it should be displayed. Alternatively, another file format may be used.

Referring back to FIG. 5, the digital cinema server 102 is loaded with a digital cinema package (DCP) 510 for a presentation that includes closed captions (e.g., expressed in a file according to SMPTE standard 0429-12) to be communicated to closed caption display system 120 over communication channel or link 123.

In one embodiment, closed caption system 120 comprises a protocol unit or module 521, which conducts communications with digital cinema server 102 over communication channel 123, which may be an Ethernet link.

Protocol module 521 obtains a plurality of language selections from caption settings 522 (shown as a data file, but which may be selected from a memory device or library with physical buttons or dials, not shown), to determine which caption languages should be displayed.

At least those captions available in a selected language are fetched by protocol module 521, and stored in caption cache 523.

Finally, protocol module 521 communicates synchronization signals from the digital cinema server 102 to timing module 524. Timing module 524 provides a clock signal to render module 525 to indicate the current position of digital cinema server 102 in the playout of the presentation represented by package 510.

Settings 522 may also direct render module 525 as to which color or polarization a given language should play in. Alternatively, the color or polarization with which captions in a particular language are rendered may be selected algorithmically, or by fixed association, e.g., settings 522 may specify a first caption be rendered in a first color, a second language in a different color, another caption be rendered in a first polarization, and yet another caption be in a second polarization orthogonal or opposite to the first polarization.

As the presentation is played, render module 525 reads caption cache 523 and anticipates when the listed captions should appear and disappear. Each caption is rendered as a mirror image (i.e., backwards reading between right to left) in the corresponding color and/or polarization, and the rendered captions are additively superimposed and displayed by multi-color and/or dual-polarization display 220. Individual captions are removed from the display in accordance with the display interval specified in the caption cache, or in some embodiments, according to a default timeout after which an aged caption is cleared.

Figure 6:
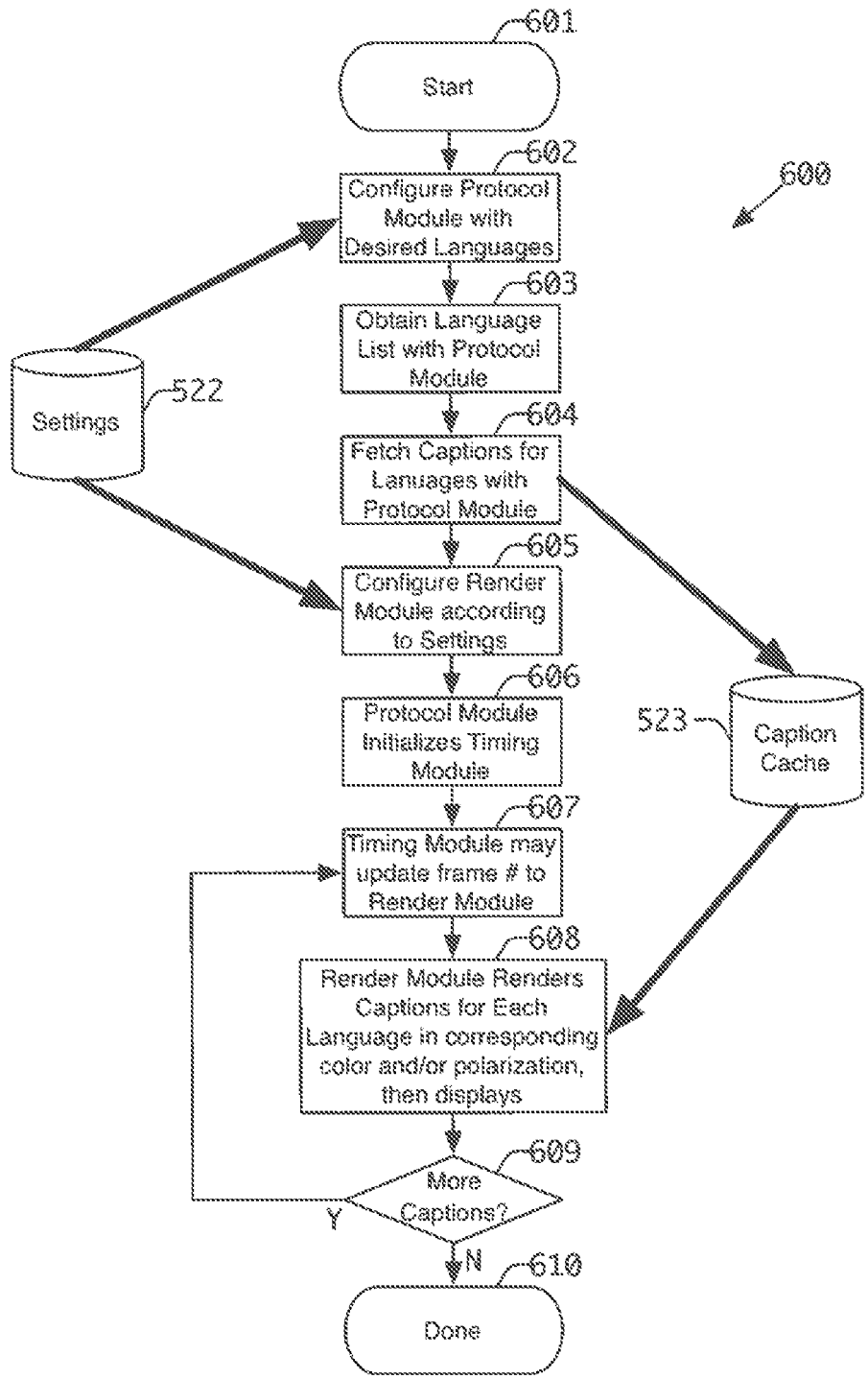
FIG. 6 is a flowchart for a method of creating and displaying the closed caption images in real time by the closed caption display.

FIG. 6 shows one embodiment of a multi-language caption display process 600 that can be used by closed caption display system 120. At step 601, the DCP 510 has been provided to digital cinema server 102, and server 102 is in communication with closed caption system 120.

At step 602, the protocol module 521 obtains the desired languages from caption settings 522. Through communication channel 123, protocol module 521 obtains a list of caption resources available for the presentation, including in what languages (e.g., by fetching an auxiliary resource presentation list of the form specified in SMTPE ST 0430-10 2010).

From the list of caption languages made available at step 603, the protocol module 521 pre-fetches captions in the selected languages and stores them in caption cache 523 at 604.

At step 605, render module 525 is configured, for example by settings 522, to display each selected language available in a corresponding, unique color. In the above example of a multicolor display, English captions are in red and French captions are in cyan. For the dual-polarization display, English captions are in a first polarization (e.g., vertical) and French captions are in the orthogonal second polarization (e.g., horizontal). This configuration ensures that when a presentation starts, patrons viewing caption display 220 through respective color reflectors will see corresponding captions in the associated colors, while others viewing caption display 220 through respective polarization reflectors will see corresponding captions in the associated polarizations.

At the start of the presentation, digital cinema server 102 sends a start point and enable signal via communication channel 123 to the protocol module at step 606, and the protocol module 521 provides these to timing module 524. Thus, timing module 524 is initialized and released (by the enabled) to run in synchrony with the presentation being projected onto screen 106. This timing relates to the intervals listed in caption cache 523 during which each caption is to be displayed.

At step 607, timing module 524 provides an updated frame counter to render module 525.

In some embodiments, the timing module may get timing updates sent by the DCS 102 through the protocol module 521 (not shown in FIG. 6). Such updates would ensure that timing module 524 cannot drift so much as to be substantially out of sync with the on-screen presentation.

At step 608, the render module 525 examines the caption cache 523 for captions to be newly added or removed for the selected languages. Captions are added in the respective colors and/or polarizations previously associated with the specific languages at step 605. Thus, in one prior example, a new French caption can be displayed in cyan by setting the green and blue components of the pixels corresponding to the interior of the characters or text of the caption (i.e., pixels inside the outline of each character) to turn on, while leaving the red component of the same pixels unchanged. If the caption is anti-aliased, the green and blue components of some pixels may be partially turned on. If the French caption is to be newly removed, the green and blue components of all pixels may be turned off (i.e., set to zero), again leaving the red component of the pixels unchanged.

If there is more than one caption appearing and/or disappearing within the same frame, then each is handled at this time.

Finally, the updated caption (to which one or more captions may be newly added and/or newly removed), is output to the multi-color or dual polarization display 220, producing an image such as that shown in FIG. 2A, FIG. 3A or FIG. 4A, which is a composite or superposition of the different captions.

At step 609, a test is made to determine whether there are more captions to be displayed. If so, process 600 loops back to step 607 and awaits the next update from the timing module. If at step 609, it is determined that there are no more captions to be rendered, then process 600 terminates at step 610.

In some embodiments, one or more steps in process 600 may be modified, including omitting and/or combining one or more of the features or steps described above.

In an alternative embodiment, a modified test at step 609 can be made by render module 525, by looking ahead in captions cache 523 and noting the frame count at which the next change to the caption display 220 is slated to take place. In this implementation, modified test would determine whether the timing module has reported an update to the count associated with that next change. If so, then the loop back would be to step 608, to render the appropriate changes to the caption display.

Figure 7:
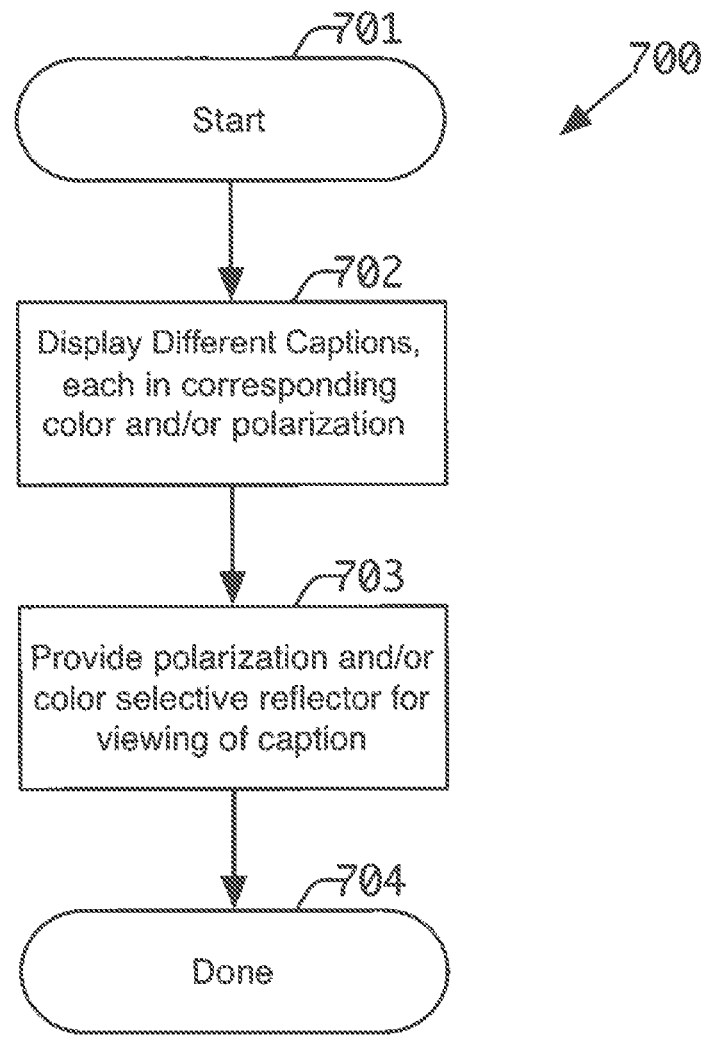
FIG. 7 is a flowchart of a method for providing different sets of closed captions for use in an exhibition theater.

FIG. 7 shows a closed caption presentation process 700 suitable for use in a theater or other viewing or exhibition venues. At step 701, the process starts with the different sets of closed captions (e.g., different languages, or different versions in the same language) as well as the color corresponding to each caption already provided to the caption display system.

At step 702, the closed captions for each of the predetermined languages or versions are displayed in the corresponding predetermined colors and/or polarizations on a common display (e.g., 220) of closed caption display system 120.

At step 703, individual patrons (e.g., 113 and 114) are provided with respective reflectors (e.g., 133 and 134), designed to reflect one of the predetermined colors (e.g., red and cyan) and/or complementary polarizations (i.e., orthogonal or opposite polarizations, such as vertical and horizontal linear polarizations, or right-handed and left-handed circular polarizations) for viewing the caption display of the display system 120. For the purpose of this discussion, orthogonal and opposite polarizations can be regarded as interchangeable, since embodiments implemented using orthogonal linear polarizations can also be modified for use with opposite circular polarizations. Thus, an individual patron may selectively view a closed caption for a corresponding one of the predetermined versions or languages, without interference or overlap from other captions of different versions or languages. Closed caption presentation process 700 completes at step 704.

Figure 8:
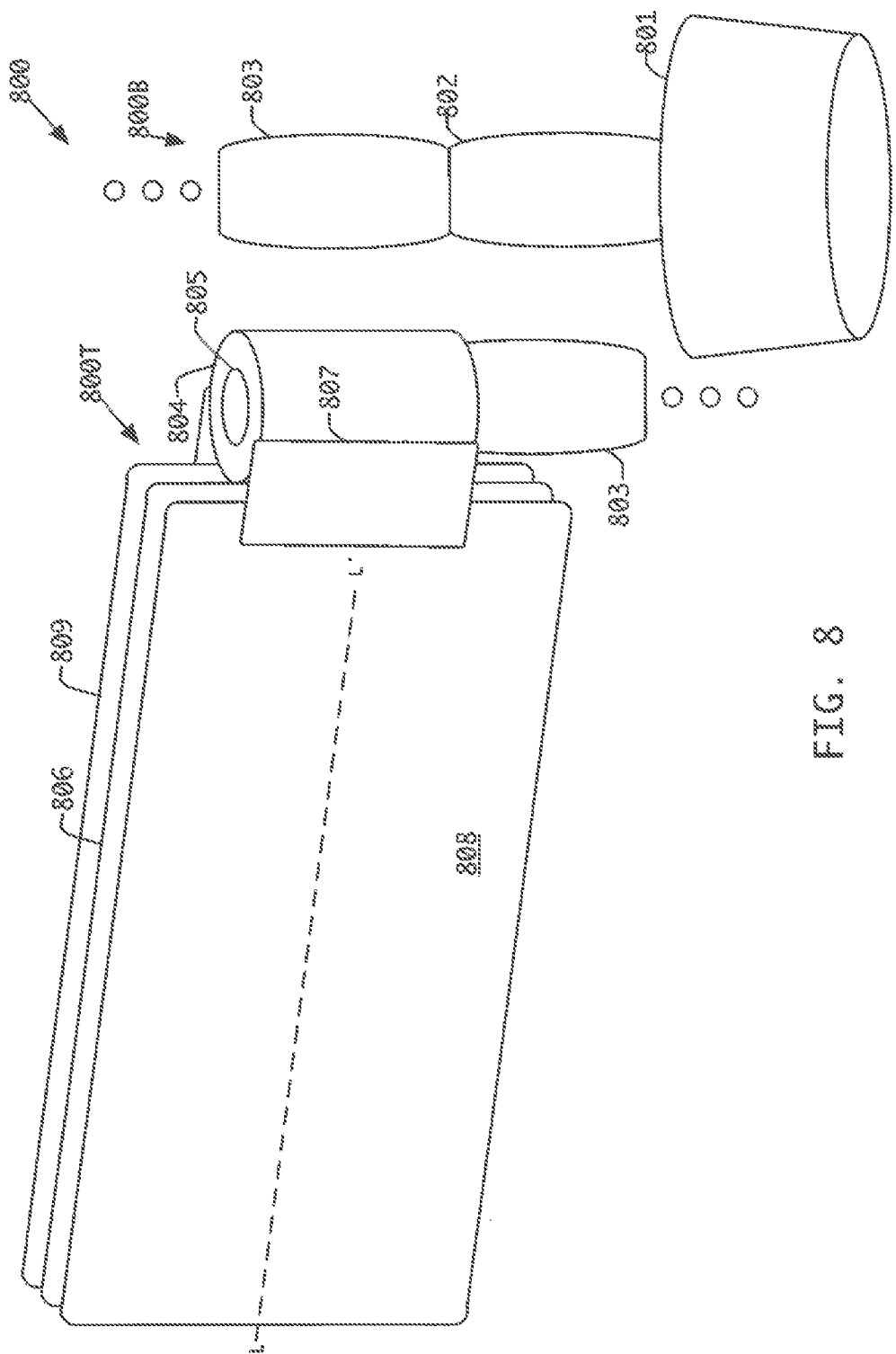
FIG. 8 is one embodiment of a reflector suitable for viewing the closed caption display.

FIG. 8 is one embodiment of a reflector suitable for viewing captions on the multi-color display. The reflector 800, which is chair-mounted, includes base assembly 800B and top assembly 800T. In one embodiment, adjustable arm 130 comprises a flexible chain of segments 802, 803, 804, which can be attached to seat 111. Base assembly 800B is an embodiment of adjustable arm 130 of seat 111, and includes base 801 and multiple arm segments 802, 803. Base 801 can be a truncated cone shape having minimum and maximum diameters selected to allow base 801 to be inserted firmly into a receptacle in seat 111, for example a theater seat cup holder (not shown). Base 801 is rigidly attached to a first arm segment 802, which in turn is flexibly attached to a chain of flexibly attached additional arm segments 803. The flexible attachment mechanisms of the segments allow each segment to be adjustable in different directions.

In one example implementation of the flexible chain of arm segments 802 and 803, each segment 802/803 might provide a ball (not shown) to engage in a socket (not shown) of the next segment 803, allowing arm 130 to be adjusted, but providing rigidity once positioned. In an alternative embodiment, first arm segment 802 can be attached directly to a portion of seat 111.

In the example of FIG. 8, top assembly 800T corresponds to a reflective panel (e.g., 133, 134, 136 or 137 of FIG. 1), and includes a final arm segment 804 with receptacle 805, mounting plates 807, rigid panel or plate 806 with reflective surfaces 808 and 809 operating in spectral ranges different from each other. Reflective surfaces 808 and 809 are physically attached to panel 806 in different manners, e.g., can be laminated, or sandwiched, or as deposition layers, among others.

In one embodiment, reflective surfaces 808 and 809 may be interference filters that reflect different selected portions of the spectrum, e.g., each reflecting at least a portion of the visible spectrum corresponding to one of the predetermined caption language colors, and reflecting little or substantially none of another portion of the visible spectrum corresponding to the other predetermined caption language colors.

Mounting plates 807 attach rigid plate 806 to final segment 804. Mounting plates may be cast as an extension of segment 804, or may be adhered or bolted, and may be through-bolted, cemented, or clipped to rigid plate 806. In the embodiment shown, top assembly 800T may be flipped or turned by 180 degrees by engaging the other end (top end shown in FIG. 8) of final segment 804 onto the last of the arm segments 803, e.g., via receptacle 805 provided on both ends of segment 804. Thus, a viewer can choose either surface 807A or surface 807B for viewing the corresponding caption.

In an alternative embodiment, rigid plate 806 can be pivotably connected to final segment 804 (e.g., may not be using mounting plates 807 as in FIG. 8) to allow plate 806 to pivot and rotate about its long or longitudinal axis LL' or around an axis of segment 804.

To operate in the above examples of English caption in red and French caption in cyan, reflective surface 808 can be configured to be substantially reflective in the longer wavelength (red) portion of the spectrum, and little or substantially unreflective in the shorter wavelength region, including green and blue. As such, reflective surface 808, when facing the patron and used to view multi-color display 220, would act as reflector 133 for viewing the English caption. If reflective surface 809 is configured for reflecting shorter wavelengths and not longer ones, then when it is oriented to face the patron, it would act as reflector 134 for viewing the French caption. Thus, a single assembly 800 can be used to provide an appropriate viewing reflector for either one of two simultaneously presented closed caption languages.

In such an embodiment, rigid plate 806 may be substantially black (i.e., not returning or transmitting light passing through either surface 808 or 809), or matte (i.e., diffusely scattering light transmitted through either surface), or transparent (i.e., transmitting light passing through either surface). However, if plate 806 is transparent to a certain degree, it should not provide a surface or interface that allows any substantial specular return of light passing through surface 808 or 809, as that would result in the wrong set of captions being visible in addition to the captions properly reflected by the surface selected by the viewer.

In this embodiment, reflective surface 808 can be the high-pass interference filter model #35590 (Cyan), and surface 809 can be the low-pass interference filter model #35900 (Orange), both manufactured and marketed by Rosco Laboratories, Inc. of Stamford, Conn.; which will work with a typical HDTV monitor, such as model N3000W manufactured by Viewsonic Corporation of Walnut, Calif.

In an alternative embodiment of top assembly 800T, rigid plate 806 may be a double-sided mirror, and surfaces 808 and 809 filter that absorb portions of the spectrum corresponding to the predetermined color of the other caption language. That is, if surface 808 is used to implement reflective plate 133, then surface 808 would be selected to absorb at least substantially all of the wavelengths of the visible spectrum used to display the French captions. In this embodiment, the red light of English caption 321 passes through surface 808, is reflected off of rigid plate 806 (which is not wavelength selective, i.e., has a relatively flat reflectivity over substantially the entire visible spectrum), and returns through surface 808 to the eye of patron 113. However, the green and blue light of French caption 422 will be attenuated passing through surface 809, and whatever remains to be reflected by rigid plate 806 will also be attenuated on the return trip through surface 808. A filter suitable for this when used in conjunction with the above-mentioned monitor is gel model #E135 (Orange), by above listed Rosco Laboratories. For surface 809 in this embodiment, a filter gel that transmits a substantial portion of green and blue light and attenuates red is model #E118, also by Rosco.

Some filters used in embodiments of this type may produce a first-surface reflection of a broad spectrum, which may result in too large a fraction of the other language caption being returned. In such situations, surfaces 808 and 809 may be pitched about the upper or lower long edge of rigid plate 806, so that surfaces 808 and 809 are not parallel to the reflective surfaces of plate 806. Such an arrangement will cause the first surface reflection from surfaces 808 and 809 to be at substantially different angle than reflections from the corresponding surfaces of 806, so that the first surface reflections will not interfere with the viewing of the desired captions.

In one embodiment, each reflective panel or filter is configured such that it reflects the color of its associated caption at a high brightness ratio, for example, greater than 20:1, compared to the color used for a different caption, thus favoring the selected caption language. For example, at the ratio of 20:1, although there is still about 5% of distracting phantom reflection, the effect is tolerable. Lower ratios will produce increasingly distracting phantom reflections of the incorrect caption language, while a higher ratio will make the desired caption language more distinct.

Figure 9:
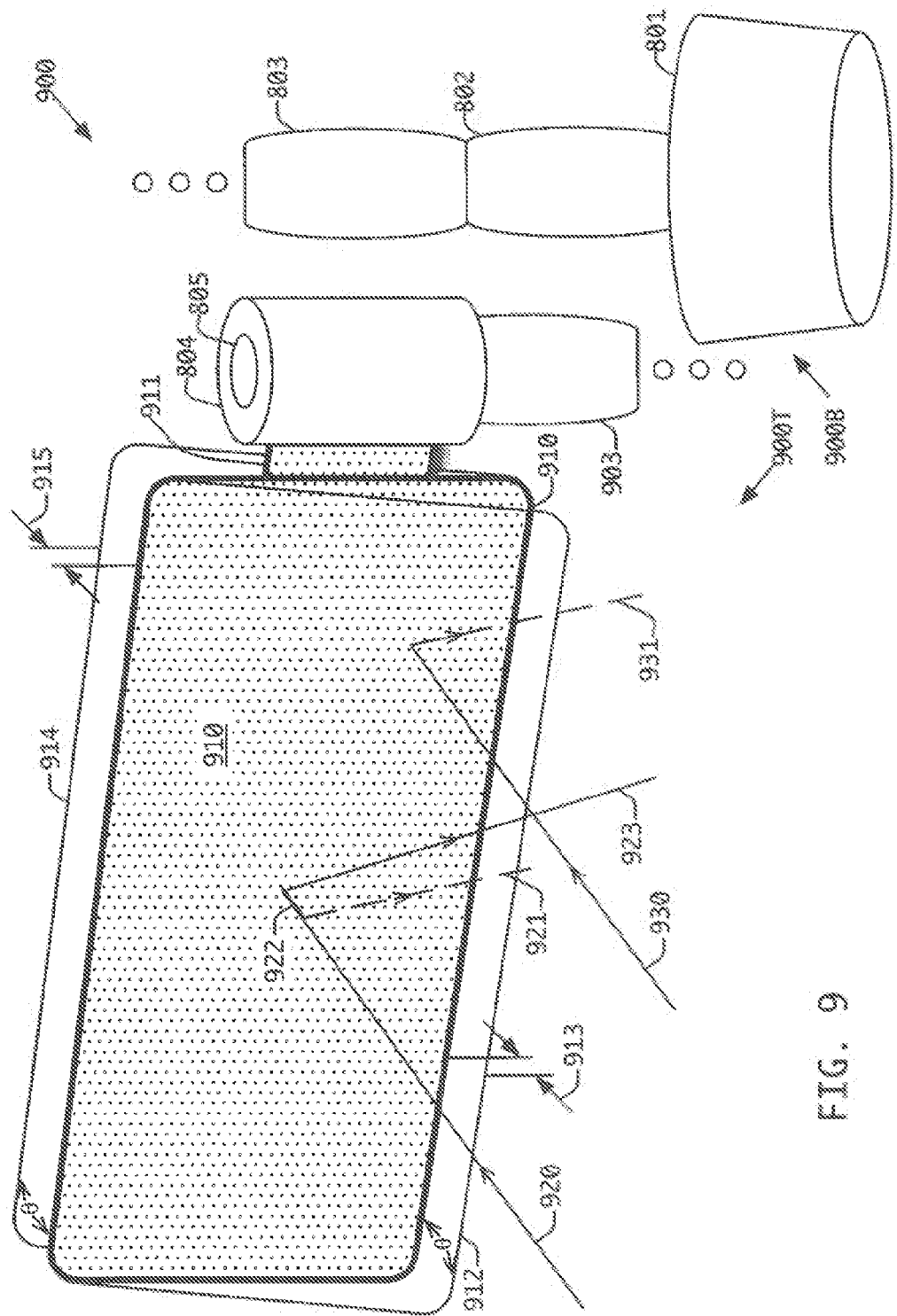
FIG. 9 is another embodiment of a reflector suitable for viewing the closed caption display.

FIG. 9 shows an embodiment of a reflector 900 suitable for viewing captions on a dual-polarization display 320. Reflector 900 has a base assembly 900B that is the same as assembly 800B described for FIG. 8. The top assembly 900T corresponds to a reflective panel (e.g., 133, 134, 136 or 137 of FIG. 1), and includes a final segment 804 for coupling to segment 803 of the base assembly, reflective panel 910 attached to final segment 904 (e.g., by means of fin 911 extending from reflective panel 910 and captured in a slot in final segment 904), and first and second polarizing filters 912 and 914.

First polarizing filter 912 is attached to reflective panel 910 along the top edge, but kept at a non-zero angle "θ" with respect to the panel 190 to maintain a gap 913 along the bottom edge. This angled configuration can be implemented using spacers, frame or other suitable mechanisms known to one skilled in the art. Similarly, second polarizing filter 914 is attached to reflective panel 810 along the bottom edge, but also kept at a non-zero angle "θ" with respect to panel 190 to maintain a gap 915 along the opposite edge. As explained in more detail below, the angle "θ" has to be sufficiently large so that different reflections 931 and 923 are angularly separated to allow a desired caption (along ray 923) to be selectively viewed by a patron without also viewing a reflected portion of a different (or unintended) caption (along ray 931). At a minimum, this angle "θ" corresponds to half the angle subtended by the height "h" (see FIG. 1) of the caption to be viewed (e.g., the height of 3 lines for a 3-line caption) from the viewer's location along the corresponding reflected sightline. Since this angle varies according to the location of the viewer (a larger angle when closer to the closed caption display, e.g., the back rows of the theater) and/or the caption's height, in practice, the angle for each reflector can be configured for use in as many rows in the theater as desired, and to provide sufficient angular separations for a maximum height expected for typical captions.

For example, the minimum angle "θ" may be computed with EQ. 1:

$$\theta_{MIN} = \tan^{-1}\left(\frac{h \times \cos(e)}{2L}\right) \quad \text{EQ. 1}$$

where L is the total distance from center of front surface 122 to center of reflector 136 (i.e., distance or segment CC' in FIG. 1) and from reflector 136 to the eye of patron 116; and "e" is the elevational angle formed between the normal of the screen at its center and the projection of the line CC' on the vertical plane bisecting screen 122. In an embodiment where "h" is one foot, the length "L" is 12 feet, and angle "e" is 10°, then the minimum angle "θ" may be computed with EQ. 1 to be about 2.35°.

In general, when the caption display system 120 is mounted at an angle on brackets 121 to better face the audience along the reflected sightlines so that their average angle "e" is approximately zero, then the cosine term may be neglected (i.e., equal to 1) and the equation simplifies to EQ. 2, which for the example given, results in a value for angle θ of 2.39°.

$$\theta_{MIN} = \tan^{-1}\left(\frac{h}{2L}\right) \quad \text{EQ. 2}$$

Any minimum value for θ computed with EQ. 2 can be used in the row corresponding to the distance L, or further forward in the auditorium. Although there is no strict upper limit for the angle θ (except that a reflected sightline has to pass through the polarizer for the reflected caption to be viewed), it will be limited mostly by practical considerations such as the caption display's location (e.g., mounting the display close to the ceiling may not be convenient or desirable). Thus, a practical limitation may suggest an upper limit for angle θ of about 45°, since an angle greater than that would require the caption display to be located on the ceiling in front of a patron, which may increase the complexity of mounting the display as well as being distracting to the audience.

In one embodiment, polarizing filters 912 and 914 can both be linear polarizing filters, or alternatively, they can both be circularly polarizing filters. In the alternative embodiment, since circular polarizers comprise a lamination of a quarter-wave retarder and a linear polarizer, the circular polarizers 912 and 914 must be oriented with the linear polarizing surface facing reflective plate 910.

The attachment of reflective plate 910 to final segment 804 may be rigid (as shown with fin 911), and may be adhered, bolted, cemented, clipped, cast as a single part, or other configuration. In the embodiment shown, top assembly 900T may be flipped by engaging the other end of final segment 804 onto the last of the arm segments 803, for example by engaging the last segment 803 with receptacle 805. So chair-mounted reflector 900 might be arranged to have first polarizing filter 912 facing a patron, or by flipping the top assembly 900T (e.g., turning assembly 900T upside down) and engaging the other end of final segment 804 with last segment 803, so that second polarizing filter 914 can face the patron.

In an alternative embodiment, in lieu of fin 911 or other rigid attachment, reflective plate 910 may be pivotably attached (not shown) to final segment 804 to allow a patron to flip reflective plate 910 over, and use the side with the other polarizer (e.g., 914) without detaching from the adjustable arm 136.

To operate in the above examples of using vertical polarization for English caption and horizontal polarization for French caption, polarization filter 912 can be configured to substantially transmit vertical polarization, and absorb or reject horizontal polarization, and polarizing filter 914 can transmit horizontal polarization and absorb or reject vertical polarization. As such, when a patron uses polarizing filter 912 to view dual-polarization caption display, top assembly 900T would act as reflector 136 for viewing the English caption. If polarizing filter 914 is facing the patron, top assembly 900T would act as reflector 137 for viewing the French caption. Thus, a single assembly 900 could be used to provide an appropriate viewing reflector for either one of two simultaneously presented closed caption languages.

When filter 912 is facing the patron 116 and reflective panel 910 is properly positioned for reflected viewing of closed caption display, light rays 920 and 930 from pixels on the caption display will hit the front surface of polarizing filter 912. In this example, light ray 920 comes from a pixel having the first polarization (vertical), and therefore displays English captions. Light ray 930 comes from a pixel having the second polarization (horizontal), and therefore displays French captions. As light ray 920 impinges on polarizing filter 912, a reflected ray 921 representing a fractional portion of vertically polarized ray 920 is specularly reflected. Reflected ray 921 amounts to about 3% of the original ray 920, but may be less if anti-reflective coatings are used on filter 920.

Transmitted ray 922 proceeds to reflective surface 910 and is reflected as ray 923, still having substantially the same polarization as ray 920, and returning through filter 912 to be viewed by patron 116. Due to the angle between filter 912 and reflective plate 910 maintained by the construction of top portion 900T, reflected rays 921 and 923 are not parallel to each other. In adjusting the top assembly 900T to optimize viewing of a caption, a patron will typically adjust the angle of the reflective panel 910 with respect to the caption display to optimize or maximize the brightness of reflected ray 923 (but usually not the angle "θ" between the polarizer 912 and panel 910). In this case, reflected ray 921 will fall outside the patron's field of view of the reflected caption display.

Horizontally polarized ray 930 also produces a specularly reflected ray 931 from the first surface of filter 912, which, like reflected ray 921, will also not be viewed by the patron due to the spatial or angular separation arising from the angle of filter 912 with respect to panel 910. Furthermore, since the polarization of ray 930 does not match that of filter 912, any portion of ray 930 that is not reflected as ray 931 will be substantially absorbed by polarizing filter 910.

As a result, the specularly reflected rays 921 and 931, comprising light from both the first and second captions, are not seen by the patron, with only reflected ray 923 reaching patron 116. Since reflected ray 923 is from a pixel of the first polarization and displaying the English captions, only the English caption is seen by patron 116. A corresponding behavior is observed for patron 117 facing properly oriented horizontally polarized filter 914, resulting in only the French caption being seen.

In those embodiments employing circularly polarizing filters, the surface of the filter (e.g., 912) facing the patron must be the circular polarizing filter's quarter-wave retarder component, leaving the surface of circular polarizing filter facing the reflective plate 910 to be the linear polarizer component. As a result, the transmitted ray 922, in a circularly polarized embodiment, is substantially linearly polarized, and the corresponding ray 923 as initially reflected by plate 910 will be likewise linearly polarized and will re-enter circular polarizer 912, such that reflected ray 923 that emerges from filter 912 will be substantially circularly polarized (though having the opposite handedness compared to ray 920). The nature of the polarization of the reflected ray 923 does not affect viewing of the corresponding caption by patron 116, so long as the patron 116 is not wearing polarizing glasses.

If the patron 116 is wearing polarizing glasses, e.g., as when viewing a stereoscopic 3D presentation on screen 106, then, depending on its polarization, the reflected ray 923 may pass through only one lens of the polarizing glasses and seen by only one of the patron's eyes. In this case, the caption will not be seen in 3D because it does not have a parallax component. This can be advantageous since the patron can read the caption without the strain of continually re-converging his eyes from the current apparent depth of the 3D presentation to the (generally) different depth of the caption display.

In one embodiment, each reflective polarizer is configured such that it reflects the polarization of its associated caption at a high brightness ratio, for example, greater than 20:1, compared to the other polarization used for a different caption, thus favoring the selected caption language. A lower ratio will produce distracting phantom reflections of the incorrect language, while a higher ratio will make the desired language more distinct. Such ratios are easily obtained with polarizing filters 912 and 914 comprising polarizing materials commonly available, such as those manufactured and marketed by American Polarizers, Inc., of Reading, Pa.

In another embodiment, reflector 133, 134, 136 or 137 can further include a color filter, which in combination with one of the two polarizing filters already described can distinguish among four distinctly encoded captions.

Figure 10:
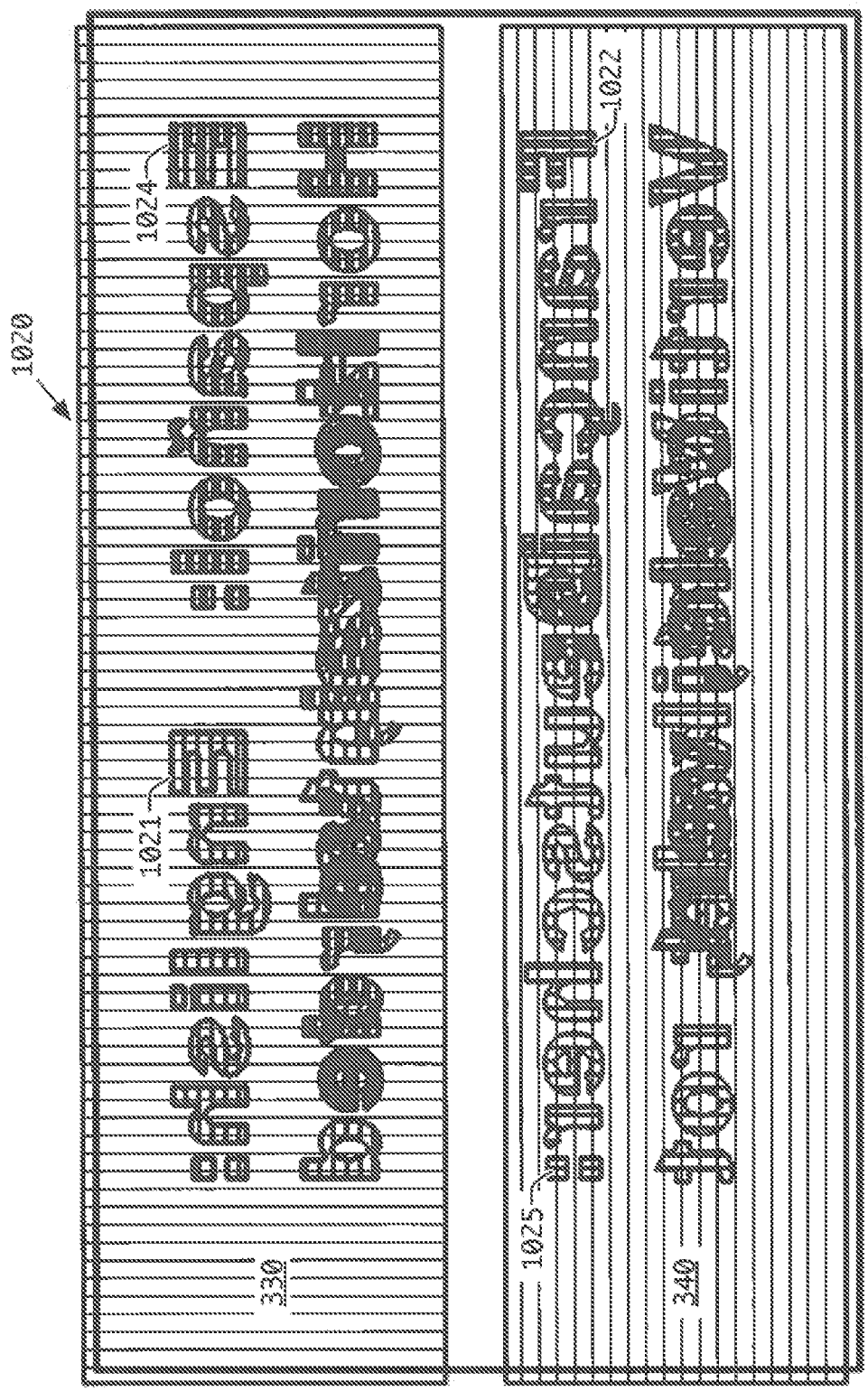
FIG. 10 shows another embodiment of the closed caption display in which the two polarizations occupy different regions of the screen, but with four captions displayed, each in a different combination of one of two colors and one of two polarizations.

FIG. 10 shows another embodiment of the closed caption display in which the two polarizations occupy different regions of the screen, but with four captions displayed, each in a different combination of one of two colors and one of two polarizations. In this example, closed caption display 1020 has upper pixels that are vertically polarized by polarizing filter 330 and lower pixels that are horizontally polarized by filter 340. However, display 1020 is showing four captions, of which: English language caption 1021 is shown in red and vertically polarized, French language caption 1022 is shown in red and horizontally polarized, Spanish language caption 1024 is shown in blue and vertically polarized, and German language caption 1025 is blue and horizontally polarized.

Such a display as 1020 is created by modifying settings 522 and render module 525 to, in addition to tracking in which polarized pixels each language is to be rendered, to further track a color in which each caption language is to be rendered. Thus, at step 605, the render module 525 is configured so that at step 608, the render module 525 renders the captions of each language to be displayed on pixels of the predetermined polarization and color.

Correspondingly, the construction of reflectors 133, 134, 136 and 137 would include a filter and reflective plate, with the filter transmitting not only light having a particular polarization, but also a portion of the visual spectrum corresponding to the color of one caption having the same polarization, but not transmitting the portion of the visual spectrum corresponding to color(s) of other captions having the same polarization.

Figure 11:
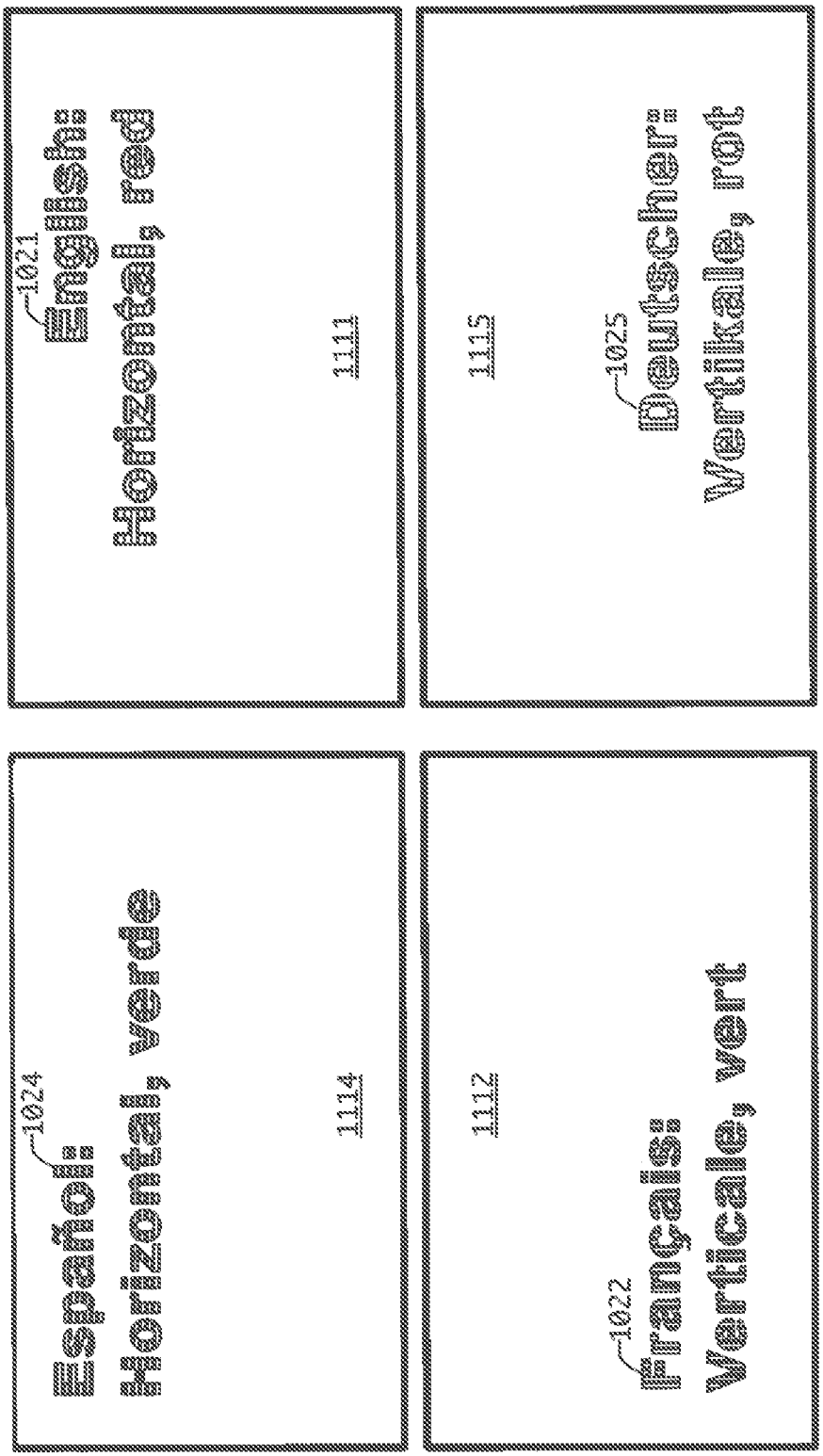
FIG. 11 shows the four captions of FIG. 10 being viewed separately through different combinations of polarizers and color filters.

FIG. 11 shows the four captions being viewed separately through different combinations of polarizers and color filters. Thus, if the filters of reflectors 133, 134, 136 and 137 are configured to transmit, respectively, vertically polarized red light, horizontally polarized red light, vertically polarized blue light, and horizontally polarized blue light, then patrons 113, 114, 116 and 117 will see corresponding reflected closed caption 1111, 1112, 1114 and 1115, each showing substantially only one of the captions 1021, 1022, 1024 and 1025, with the captions being shown simultaneously in four languages by the closed caption display system.

In another embodiment (not shown), closed caption display system 120 can also show captions in a third color different from the first and second (e.g., green), and reflectors provided to reflect substantially only horizontal and vertically polarized green light, thus providing a display for closed captions simultaneously in six languages. The number of different captions for display can be further increased by using different colors for representing additional captions, as long as the spectral ranges (which can be discontinuous) for these colors can be effectively separated by corresponding filters. In one embodiment, the colors for the different captions are selected to be rendered by one or more mutually exclusive primaries of the display, e.g., "red" (comprised of the red primary) and "cyan" (comprised of the green and blue primaries) can be used. In other embodiments, however, the colors for showing different captions on a display or monitor can have some overlap within the visible spectrum (i.e., can have overlapping spectral ranges), as long as each color has sufficient intensity for the caption to be displayed in a certain spectral range that has negligible overlap with another color for a different caption, so that appropriate filters can be used to separate the captions for individual viewing. In other words, each caption should be displayed in at least one portion of the spectrum that does not significantly overlap with the spectral range of another caption's color.

Furthermore, instead of having a dual-filter mount on the respective top assemblies of the reflectors (as shown in FIG. 8 or FIG. 9), other embodiments of the reflector can include a multi-sided or multi-faceted configuration to accommodate additional combinations of color filters and polarizers that can be used for selectively viewing of different captions.

Likewise, instead of having a dual-filter mount, each reflector assembly may be dedicated to a particular set of captions (e.g., only those in red) and thus have only one reflector. With single-reflector assemblies, an exhibition theatre maintains a mixed inventory of dedicated reflectors, some for a first color/polarization, and some for others. With multi-faceted configurations, an exhibition theatre may maintain a single inventory that provides for all available caption display color/polarization combinations.

In still other embodiments, rather than having the pixels of closed caption display system having distinct polarizations be separated into the upper and lower portions of the screen, the pixels having distinct polarizations may spatially alternate (e.g., row-by-row or column-by-column), or be time-domain multiplexed as previously mentioned in connection with caption display 420 of FIG. 4A. In this way any of the more than two captions can occupy the full extent of the display rather than being constrained to a portion of the screen (as in display 220C).

One or more of the features discussed above can also be modified or used in other combinations, for example, instead of showing different captions on a single closed caption monitor, one can also provide additional monitors, e.g., using one or more projectors for projecting different captions onto different monitors, which can be selectively viewed by different patrons.

While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A system for displaying captions for viewing, comprising:
   a display for showing at least two captions each in one of two substantially complementary polarizations; wherein the display is configured for showing a first caption in a first polarization, and a second caption in a second polarization, wherein the first polarization is one of a linear or circular polarization and the second polarization is substantially complementary to the first polarization;
   a first reflector for reflecting substantially only the first polarization for viewing the first caption; and
   wherein the display is further configured for showing the first caption in a first color having a first spectral range, and showing a third caption in the first polarization and a second color having a second spectral range, the first spectral range being substantially different from the second spectral range; and
   wherein the first reflector substantially reflecting the first spectral range and not the second spectral range; and
   the system further comprising a third reflector for reflecting substantially only the first polarization and the second spectral range for viewing the third caption.

2. The system of claim 1, further comprising a second reflector for reflecting substantially only the second polarization for viewing the second caption.

3. The system of claim 2, wherein the first and second reflectors are provided in an adjustable mount configured for varying an angle between each of the first and second reflectors and the display.

4. The system of claim 1, wherein the display is configured for showing a plurality of captions, each caption being shown in a different combination of polarization and color; the system further comprising a first reflector for viewing a first caption and a second reflector for viewing a second caption; wherein the first and second reflectors are provided in an adjustable mount configured for varying an angle between each of the first and second reflectors and the display.

5. The system of claim 4, wherein the first reflector includes a filter oriented at an angle with respect to a reflective panel, and the filter is one of a color filter and a polarizer.

6. The system of claim 1, wherein the display is configured for showing the at least two captions in one of simultaneous or time-multiplexed manner.

7. The system of claim 1, wherein the display communicates with a projection system to project the at least two captions onto at least one monitor.

8. The system of claim 1, wherein the display is further configured for showing the second caption in the first color and showing a fourth caption in the second polarization and the second color; the second reflector further substantially reflecting the first spectral range and not the second spectral range; and the system further comprising a fourth reflector for reflecting substantially only the second polarization and the second spectral range for viewing the fourth caption.

9. A reflector for selective viewing of captions, a plurality of which are shown on a display in different polarizations, comprising:
   a filter configured for viewing a caption on the display in reflection mode; the filter comprising at least a polarizer for selecting the caption for viewing without interference from other captions;
   wherein the filter further comprises a color filter, and the plurality of captions are further shown on the display in different colors in different combinations with the polarizations.

10. The reflector of claim 9, configured for varying an angle between the filter and the display for optimizing the viewing of the caption.

11. A method for displaying captions for viewing, comprising:
    showing at least a first caption and a second caption on a display;
    wherein the first caption is shown in a first polarization, and the second caption is shown in a second polarization that is complementary to the first polarization; and
    showing the first caption in a first color in a first spectral range and a third caption in the first polarization and a second color in a second spectral range without any substantial overlap with the first spectral range.

12. The method of claim 11, wherein the first polarization is one of a linear or circular polarization.

13. The method of claim 11, further comprising:
    providing a first reflector for reflecting substantially only the first polarization and the first color for viewing the first caption.

14. The method of claim 13, further comprising:
    providing a second reflector for reflecting substantially only the first polarization and the second color for viewing the third caption.

15. The method of claim 11, further comprising:
    providing a first polarizer for selecting the first polarization for viewing the first caption.

16. The method of claim 14, further comprising:
    providing a second polarizer for reflecting the second polarization for viewing the second caption.

17. The method of claim 14, further comprising:
    providing the first and second reflectors in an adjustable mount for varying an angle between each of the first and second reflectors and the display.

18. The method of claim 11, further comprising:
    showing at least the first and second captions in one of simultaneous or time-multiplexed manner.

* * * * *